United States Patent
Downen et al.

(10) Patent No.: US 6,177,955 B1
(45) Date of Patent: Jan. 23, 2001

(54) VISUAL DISPLAY INSPECTION SYSTEM

(75) Inventors: Phillip A. Downen; Michael C. Aoun, both of St. Louis, MO (US)

(73) Assignee: Westar Corporation, St. Louis, MO (US)

(*) Notice: Under 35 U.S.C. 154(b), the term of this patent shall be extended for 0 days.

(21) Appl. No.: 09/006,123

(22) Filed: Jan. 13, 1998

Related U.S. Application Data

(60) Provisional application No. 60/062,946, filed on Oct. 9, 1997.

(51) Int. Cl.[7] .................................................. H04N 17/02
(52) U.S. Cl. ........................ 348/189; 348/142; 345/904; 324/770; 382/141
(58) Field of Search .................................. 348/180, 189, 348/140, 142, 125, 92, 806; 382/141; 324/770, 750, 751, 755, 759; 356/237, 372; 345/904

(56) References Cited

U.S. PATENT DOCUMENTS

| | | | |
|---|---|---|---|
| 4,654,706 | * 3/1987 | Davidson et al. | 358/139 |
| 4,893,925 | * 1/1990 | Sweeney et al. | 356/72 |
| 5,170,127 | 12/1992 | Henley | 324/658 |
| 5,398,055 | * 3/1995 | Nanomura et al. | 348/189 |
| 5,481,202 | 1/1996 | Frye, Jr. | 324/754 |
| 5,499,097 | * 3/1996 | Ortyn et al. | 356/372 |
| 5,504,438 | 4/1996 | Henley | 324/770 |
| 5,621,521 | * 4/1997 | Takahashi | 356/237 |
| 5,638,167 | 6/1997 | Nakamura | 356/121 |
| 5,644,331 | 7/1997 | Hazama | 345/99 |
| 5,650,844 | 7/1997 | Aoki et al. | 356/237 |
| 5,793,221 | * 8/1998 | Aoki | 324/770 |
| 5,896,170 | * 4/1999 | Webb et al. | 348/140 |
| 5,969,786 | * 10/1999 | Buckley et al. | 348/140 |

FOREIGN PATENT DOCUMENTS

WO 93/19453   3/1993 (WO) ............................. G09G/3/36

OTHER PUBLICATIONS

Microvision, SS200 Flat Panel Tester, Sep. 24, 1996, 7 pages.
Microvision Production Literature, Apr. 18, 1997, 6 pages.
The Video Electronics Standards Association (VESA) publication "Flat Panel Display Measurements Standard (Proposal)," Doc. #136, Nov. 10, 1997.
Microvision Display Analysis Systems SS200 System—General Purpose Display Measurement System; SS200 System—Flat Panel Analysis System, 2 pages.
Otsuka Electronics Co., Ltd., LCD Evaluation Systems for Efficiency in Evaluation/Inspection and for Better Throughput, 16 pages.

* cited by examiner

*Primary Examiner*—Victor R. Kostak
(74) *Attorney, Agent, or Firm*—Senniger, Powers, Leavitt & Roedel

(57) ABSTRACT

A system and method for inspecting a visual display under test. A translational stage moves an optical instrument relative to the display in at least one of three generally orthogonal directions. The optical instrument is mounted on the translational stage and measures an electro-optical characteristic within a defined region of interest on the display. The display is mounted on a rotational stage for rotating the display about at least one of two generally orthogonal axes. A controller controls the translational and rotational stages to position the optical instrument at a desired position relative to the display and to position the display at a desired viewing angle relative to the optical instrument. The position of the optical instrument relative to the display is adjusted to maintain the optical axis of the instrument approximately centered within the defined region of interest on the display when the display is rotated.

18 Claims, 34 Drawing Sheets

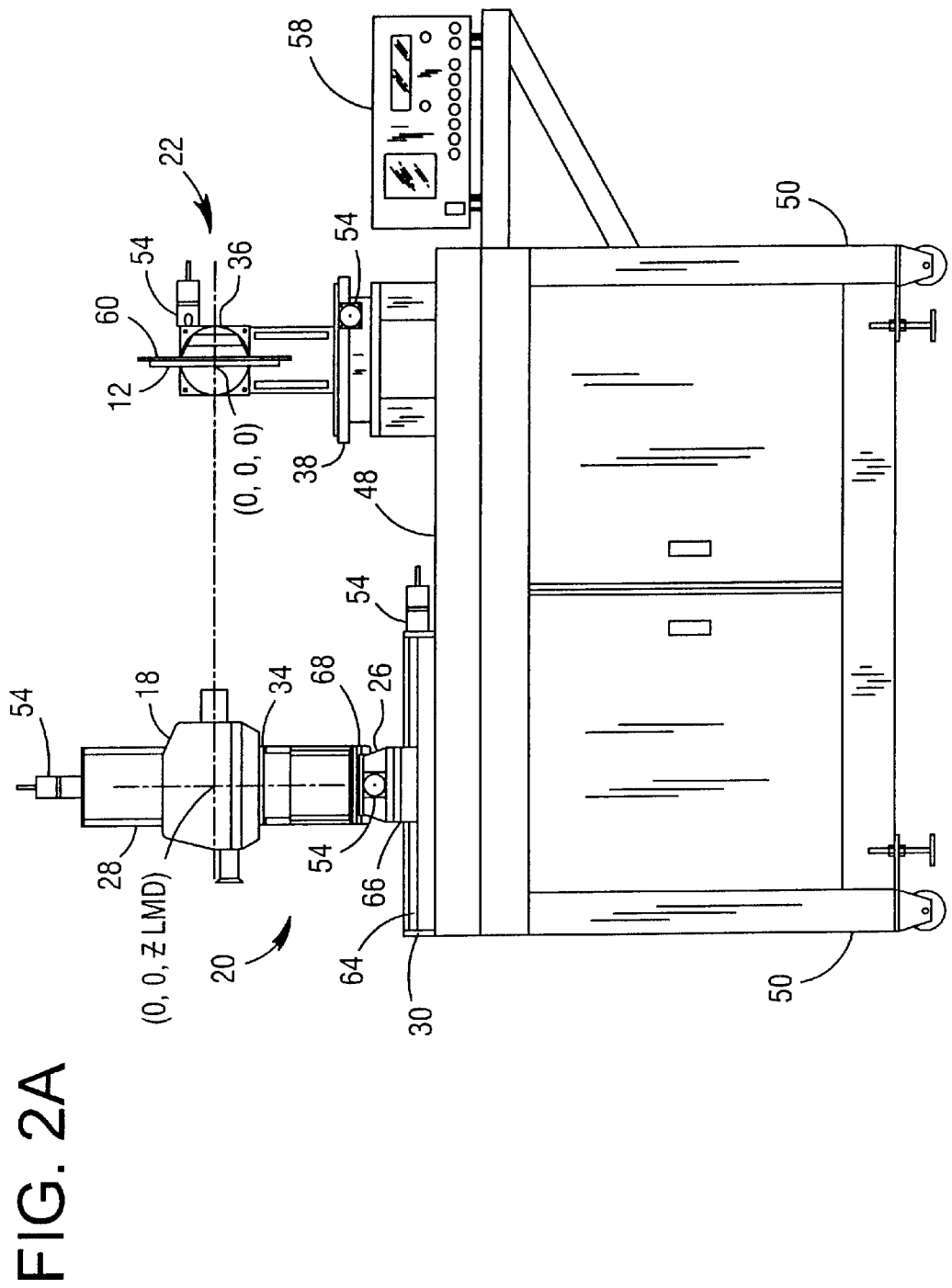

VISUAL DISPLAY INSPECTION SYSTEM

This application claims the benefit of U.S. Provisional No. 60/062,946 filed Oct. 9, 1997, the entire disclosure of which is incorporated herein by reference.

BACKGROUND OF THE INVENTION

This invention relates generally to test systems for measuring the performance of visual displays and, particularly, to a system having dual stages for providing five-axis motion for use in testing a visual display.

Present systems for testing visual displays, particularly flat panel displays, provide measurements concerning contrast ratio, luminance uniformity, chromaticity uniformity, viewing angle dependence, luminous efficiency and other such display characteristics. These measurements may be used, for example, by display manufacturers and researchers for gathering performance data, comparing the performance of materials, for new product evaluation and for quality control purposes. The Video Electronics Standards Association (VESA) publication "Flat Panel Display Measurements Standard (Proposal)," Doc. #136, Nov. 10, 1997, provides standard measurement procedures to quantify flat panel display characteristics.

Standard test procedures require the measurement of the display's light output at various locations and from various angles relative to the display surface. Positioning apparatus is available for moving a light measuring device, such as a photometer or colorimeter, relative to a stationary display under test or for moving the display relative to a stationary light measuring device. However, conventional positioning apparatus are not well suited for concurrently controlling both motions which results measurement inaccuracies. One disadvantage with conventional systems is that when examining a particular spot on the display, turning and tipping the display or the light measuring device moves the location of the spot within the light measuring device's field of view. Further, conventional display testing systems are not adaptable for use with a number of different light measuring devices nor do they provide automated testing to obtain a full range of normal and off-normal electro-optical performance measurements.

SUMMARY OF THE INVENTION

The invention meets the above needs and overcomes the deficiencies of the prior art by providing an accurate, reliable and adaptable system for measuring the optical performance of a visual display under test. This is accomplished by an improved five-axis motion stage which controls relative movement between a light measuring device and the display. Such a motion stage moves the light measuring device in three orthogonal directions and moves the display in two rotational directions to provide complementary movements with respect to five axes. Thus, the light measuring device of the system can inspect the display's light output from a number of different viewing angles and at a number of different positions. By concurrently controlling three-axis and two-axis motion, the system can automatically track a region of interest on the display and maintain a substantially uniform distance between the light measuring device and the spot which results in maintaining focus and approximate spot size. In this manner, the system may be used to verify several aspects of display performance including contrast ratio, luminance uniformity, chromaticity uniformity, viewing angle dependence and luminous efficiency. In addition, the system is easily implemented, economically feasible and commercially practical.

Briefly described, a visual display inspection system embodying aspects of the invention includes an optical instrument for measuring an electro-optical characteristic within a defined region of interest on a display under test. The optical instrument is mounted on a translational stage which moves it relative to the display in at least one of three generally orthogonal directions. The display is mounted on a rotational stage which rotates it about at least one of two generally orthogonal axes. The system also includes a controller for controlling the translational and rotational stages to position the optical instrument at a desired position relative to the display and to position the display at a desired viewing angle relative to the optical instrument.

Another embodiment of the invention is directed to a method of inspecting a visual display under test with an optical instrument positioned apart from the display and having a field of view which defines an optical axis. The method includes the steps of mounting the display on a rotational stage for rotating the display about at least one of two generally orthogonal axes and rotating the display with the rotational stage to position the display at a desired viewing angle relative to the optical axis. The method also includes defining a region of interest on the display and adjusting the position of the optical instrument relative to the display in at least one of three generally orthogonal directions to maintain the optical axis approximately centered within the defined region of interest on the display when the display is rotated. The method further includes the step of measuring an electro-optical characteristic within the defined region of interest on the display with the optical instrument.

Alternatively, the invention may comprise various other systems and methods.

Other objects and features will be in part apparent and in part pointed out hereinafter.

BRIEF DESCRIPTION OF THE DRAWINGS

FIG. 2A is a front elevation of the system of FIG. 1.

Corresponding reference characters indicate corresponding parts throughout the drawings.

DETAILED DESCRIPTION OF PREFERRED EMBODIMENTS

Figure 1:
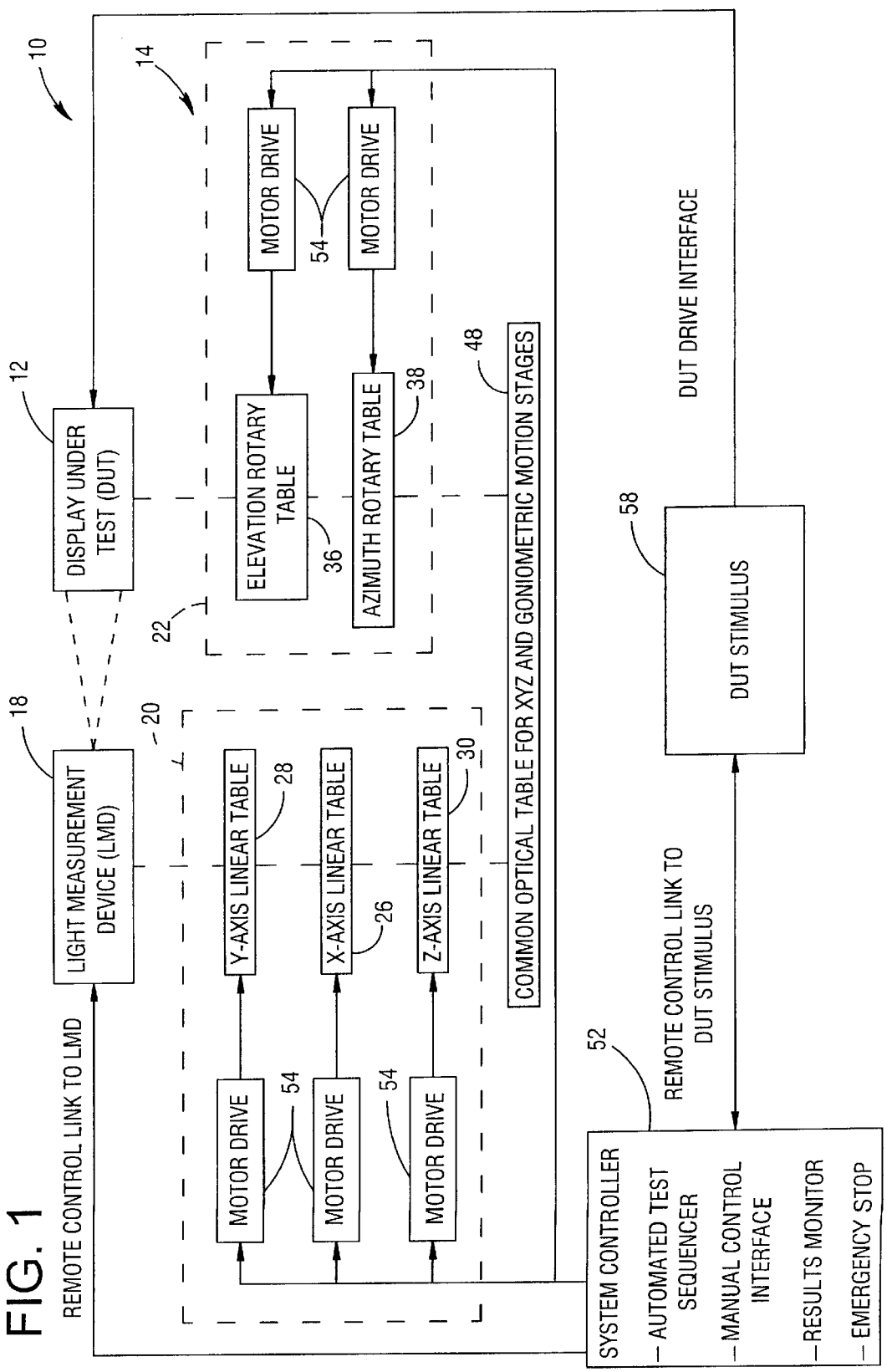
FIG. 1 is a block diagram of a visual display performance measurement system according to a preferred embodiment of the invention.

Referring now to FIG. 1, a visual display performance measurement system, generally indicated at 10, provides an accurate, reliable and adaptable system for measuring the optical performance of a display under test (DUT) 12 (e.g., a flat panel display). According to the invention, system 10 uses a five-axis motion stage, generally indicated at 14, for controlling relative movement between a light measuring device (LMD) 18 and the DUT 12. DUT 12 displays a predetermined image or pattern and, in turn, the LMD 18 provides measurements of the display's light output at specific regions of interest on the surface of DUT 12. In this manner, the system 10 may be used to verify essentially all aspects of display performance including contrast ratio, luminance uniformity, chromaticity uniformity, viewing angle dependence, luminous efficiency, and the like.

It is to be understood that LMD 18 may be any of a number of optical instruments used to measure light, luminance, color or color temperature, such as a charge coupled device camera, photometer, spectroradiometer, luminance meter, colorimeter, photodiode, photomultiplier tube or the like. Preferably, LMD 18, has a relatively narrow field of view (e.g., ⅛ to 40) and provides light measurements from a relatively small region, or spot, of interest (e.g., between 1 and about 500 pixels). As an example, photometer PR-880 and spectroradiometer PR-650, both manufactured by Photo Research, Inc., as well as the Topcon BM-5A photometer and the Minolta CS-1000 spectroradiometer, are generally suitable for use in system 10. Further, it is to be understood that system 10 may include one or more light measuring devices without deviating from the scope of the invention. In other words, system 10 may include primary and secondary optical instruments. It is contemplated that system 10 may be used for inspecting or measuring the electro-optical performance of flat panel displays such as active matrix liquid crystal display (AMLCD), field emission display (FED) and electro-luminescent (EL) cells and assemblies as well as analyzing polarizers, filters and other materials for research and development purposes.

As shown in FIG. 1, the five-axis motion stage 14 has two main components, namely, a three-axis translational motion stage 20 providing motion in three directions and a two-axis rotational motion stage 22 providing motion in two directions. According to the present invention, the translational stage 20 uses three linear tables 26, 28, 30, each positioned in one of three generally orthogonal directions, for moving LMD 18. One of the tables 26, 28, 30 includes an instrument deck 34 (shown in FIGS. 2A and 2B) on which LMD 18 is mounted. In operation, linear tables 26, 28, 30 move LMD 18 generally parallel to the axes of a three-dimensional coordinate system (e.g., an x,y,z right-handed Cartesian coordinate system).

The rotational stage 22, also referred to as a goniometer, includes an elevation rotary table 36 and an azimuth rotary table 38 for rotating DUT 12 about at least one of two generally orthogonal axes. In this embodiment, the elevation rotary table 36 tips DUT 12 forward and backward about an elevation axis 42 (shown in FIG. 3) and the azimuth rotary table 38 turns DUT 12 left and right about an azimuth axis 44 (also shown in FIG. 3). Thus, translational and rotational stages 20, 22 provide complementary movements with respect to five axes so that LMD 18 can inspect the light output of DUT 12 from a number of different viewing angles and at a number of different positions. As will be described below, by providing three-axis translational and two-axis rotational motion with stage 20 and stage 22, respectively, system 10 can track the region of interest on DUT 12 and maintain a substantially uniform distance between LMD 18 and the spot which results in maintaining focus and approximate spot size. Preferably, motion stage 14 is assembled atop a rigid optical table 48 having legs 50 (shown in FIG. 2A) which provide independent, shock-isolated support of the table 48.

A system controller 52 controls the visual display performance measurement system 10 including the relative movements of LMD 18 and DUT 12 by translational stage 20 and rotational stage 22, respectively. In one embodiment, the system controller 52 is a Pentium-300 class personal computer loaded with 32MB RAM, 3+GB hard drive, and a 12X CDROM drive. Preferably, the processor of system controller 52 executes software under a Windows NT operating system for controlling the various functions of system 10 and employs a five-axis motion control card in addition to its stock features for generating control signals for motion stage 14.

As described in detail below, system controller 52 executes software implementing a system interface for generating low level control signals which, in turn, drive a plurality of stepper motor drives 54. Each stepper motor drive 54 is associated with one of the linear motion tables 26, 28, 30 and rotary motion tables 36, 38 for providing translational and/or rotational motion. The motor drives 54 then move LMD 18 and/or DUT 12. As an example, motor drives 54 are microstepping NEMA Size 23 motors. Although not shown, it is to be understood that system controller 52 also includes motor drive amplifiers, interconnect cabling, and brake controls as are known in the art. Preferably, system controller 52 also executes software implementing a user interface, which is displayed on a monitor (not shown), for use by an operator in initializing system 10 and setting up the various performance tests for DUT 12 and for generating test reports which comply with, for example, the standards set forth by the Video Electronics Standards Association (VESA).

Referring further to FIG. 1, system controller 52 also communicates with a display stimulus system 58, such as Westar Corporation's CD-400 AMLCD cell drive system. The stimulus system 58 provides programmable waveforms to actively stimulate DUT 12 to display a predetermined image or pattern which may then be imaged by LMD 18 for display characterization and manufacturing verification. In addition, system 10 preferably supports other stimulus sources (e.g., Team Systems and Video Instruments sources).

It is to be understood that cabling between the various components of system 10 carries control signals and supplies power. For example, one cable may provide AC and DC power to DUT 12 while another carries elevation axis motor, limit switch, encoder and brake signals for rotational stage 22. Linked cable carriers may be used to manage the cabling for translational motion stage 20. For example, power and RS-232 connections for the primary LMD 18 and any secondary optical instruments are carried up the translational motion stage 20 through cable carriers. The linear tables 26, 28, 30 also include cables providing motor drive and limit switch signals. In one embodiment, linear table 26 contains the instrument power and serial cables (four) plus the y-axis motor and limit switch cables.

In one preferred embodiment, the system controller 52 of system 10 provides predefined test sequences for testing the performance of DUT 12 but also is responsive to user input. A graphical user interface in software provides the automated test sequences which may be edited and tailored through numerous test parameters including pass/fail limits. A manual control interface provides user control of system 10 and a results monitor displays measurement results in both a graphical and numeric manner as the tests progress.

For example, the manual control interface generated by the system controller 52 provides direct control of motion stage 14, LMD 18, and DUT 12 by the user. The user may input a desired spot location on the surface of DUT 12 and a desired viewing angle via a control mechanism such as a keyboard, joystick or mouse. Alternatively, the user may use one of the control mechanisms to incrementally move motion stage 14 as desired. The manual control interface is also used during system setup to drive motion stage 14 to its home position or to a zero position and to align LMD 18.

Preferably, system controller 52 communicates with DUT 12 via a general purpose RS-232 link. This allows the user to issue ASCII commands to a separate test pattern generator or computer, such as display stimulus system 58, the output of which drives DUT 12. It is to be understood that the general purpose RS-232 control link may operate on any available COM port at a variety of baud rates, parity, and word length settings.

According to the invention, system 10, via system controller 52, provides automated test sequences in addition to manual controls. In a preferred embodiment, the automated test sequences provided by system 10 comply with the standard test procedures set forth by VESA.

Figure 2B:
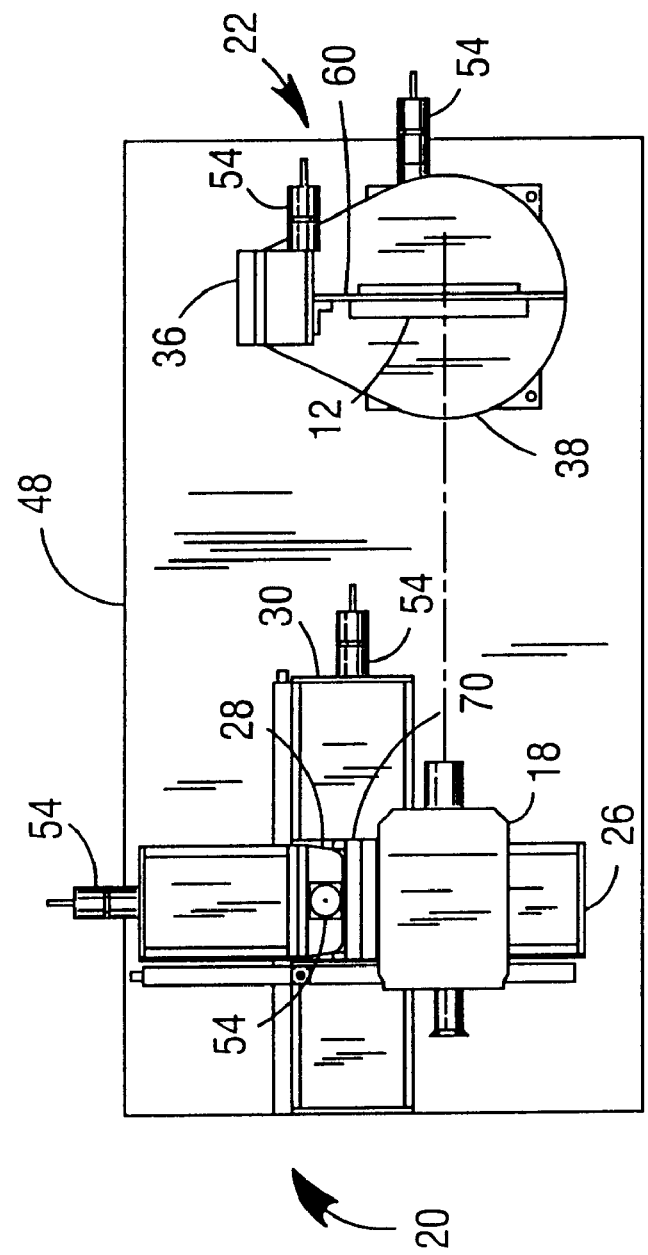
FIG. 2B is a top plan of the system of FIG. 1.

FIGS. 2A and 2B illustrate motion stage 14, including its translational and rotational stages 20, 22, mounted on optical table 48. In this instance, rotational stage 22 includes a backboard 60 on which DUT 12 is mounted for testing. As an example, the backboard 60 is a lightweight optical breadboard attached directly to elevation rotary table 36 (i.e., the component of rotational stage 22 for tipping DUT 12) and rotatable about the elevation axis 42. Preferably, azimuth rotary table 38 constitutes a turn table which supports elevation rotary table 36. Thus, when azimuth rotary table 36 turns, the elevation rotary table 36 also turns which causes DUT 12 to turn about the azimuth axis 44. In this manner, rotational stage 22 provides main axis horizontal goniometric coordinates.

In an alternative embodiment, a cradle structure made from two optical breadboards mounted at right angles to each other supports DUT 12. In this instance, one breadboard forms a backboard while the other forms a baseboard. The baseboard in this embodiment is attached directly to the tip axis portion of rotational stage 22. Advantageously, the backboard is movable to accommodate displays of different sizes and types (e.g., thinner display devices such as flat panel monitors or generic liquid crystal displays or thicker display devices such as cathode ray tube displays). Particularly for larger display devices, rotational stage 22 has a yoke assembly for supporting the cradle.

In general, system 10 measures the performance of DUT 12 at different positions on its viewable area and from different viewing angles. Stimulus system 58 stimulates DUT 12 to display predetermined targets and LMD 18 then measures the light output of the targets as displayed on DUT 12. As is known in the art, these targets are images and patterns which include, for example, full screen black or white, full screen color, gray scale patterns, black and white or color patterns, centering and alignment patterns and text.

According to the invention, system 10 moves LMD 18 relative to DUT 12 to examine a region, or spot location, of interest on the display's surface. Further, system 10 commands rotational stage 22 to tip and turn DUT 12 so that LMD 18 can measure the light output of DUT 12 from various viewing angles.

As shown in FIG. 2A, linear table 30 constitutes an elongate base supporting the two other linear tables 26, 28. According to the invention, linear table 30 is aligned generally parallel to the z-axis in an x,y,z coordinate system and includes horizontal tracks, or slide rails 64, on which a carrier 66 travels in the z-direction (i.e., forward and backward). In this instance, linear table 26, aligned generally parallel to the x-axis transverse to linear table 30, is mounted on the carrier 66. Similarly, linear table 26 includes a carrier 68 which travels on corresponding horizontal rails (not shown) in the x-direction (i.e., side-to-side or left and right). The carrier 68 holds linear table 28 which is oriented generally parallel to the y-axis (i.e., vertically). Linear table 28 also has a carrier 70 (shown in FIG. 2B) which travels on corresponding vertical rails (not shown) in the y-direction (i.e., up and down). For example, carriers 66, 68, 70 have a travel range of 12 to 48 inches, depending on the length of the respective table 26, 28, 30.

In the illustrated embodiment of the invention, LMD 18 rests on the instrument deck 34, or platform, attached to the carrier 70 of linear table 28. If desired, a secondary optical instrument, in addition to LMD 18, may also be mounted on instrument deck 34. According to the invention, translational stage 20 (with LMD 18 installed) and rotational stage 22 are aligned with each other so that system 10 can examine specific locations on DUT 12.

Figure 3:
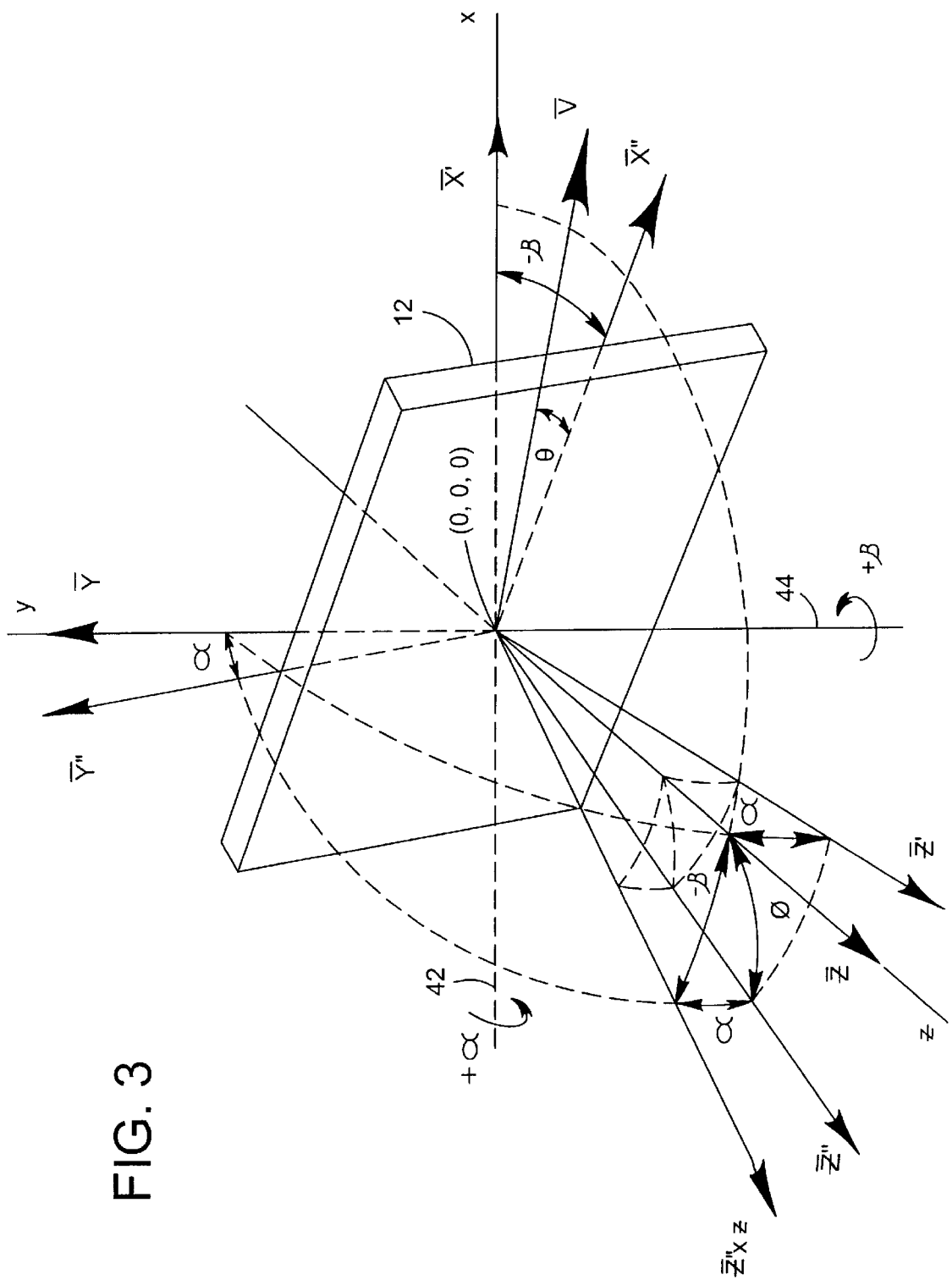
FIG. 3 is a perspective and diagrammatic view of a display under test by the system of FIG. 1.
Figure 4A:
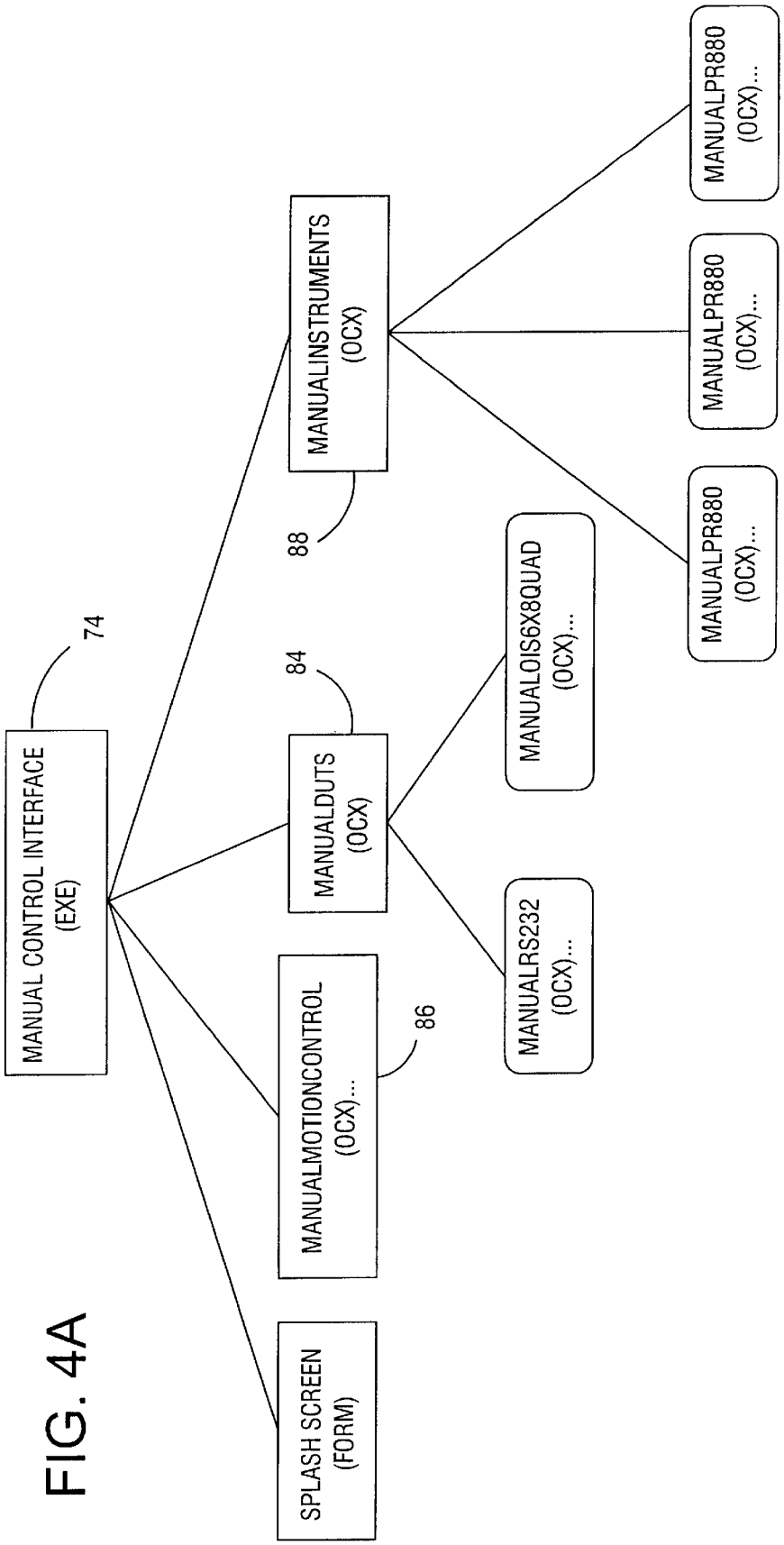
FIGS. 4A–4G, 5A–5Q, 6A–6E and 7 are software object diagrams illustrating the operation of a controller of the system of FIG. 1.
Figure 4B:
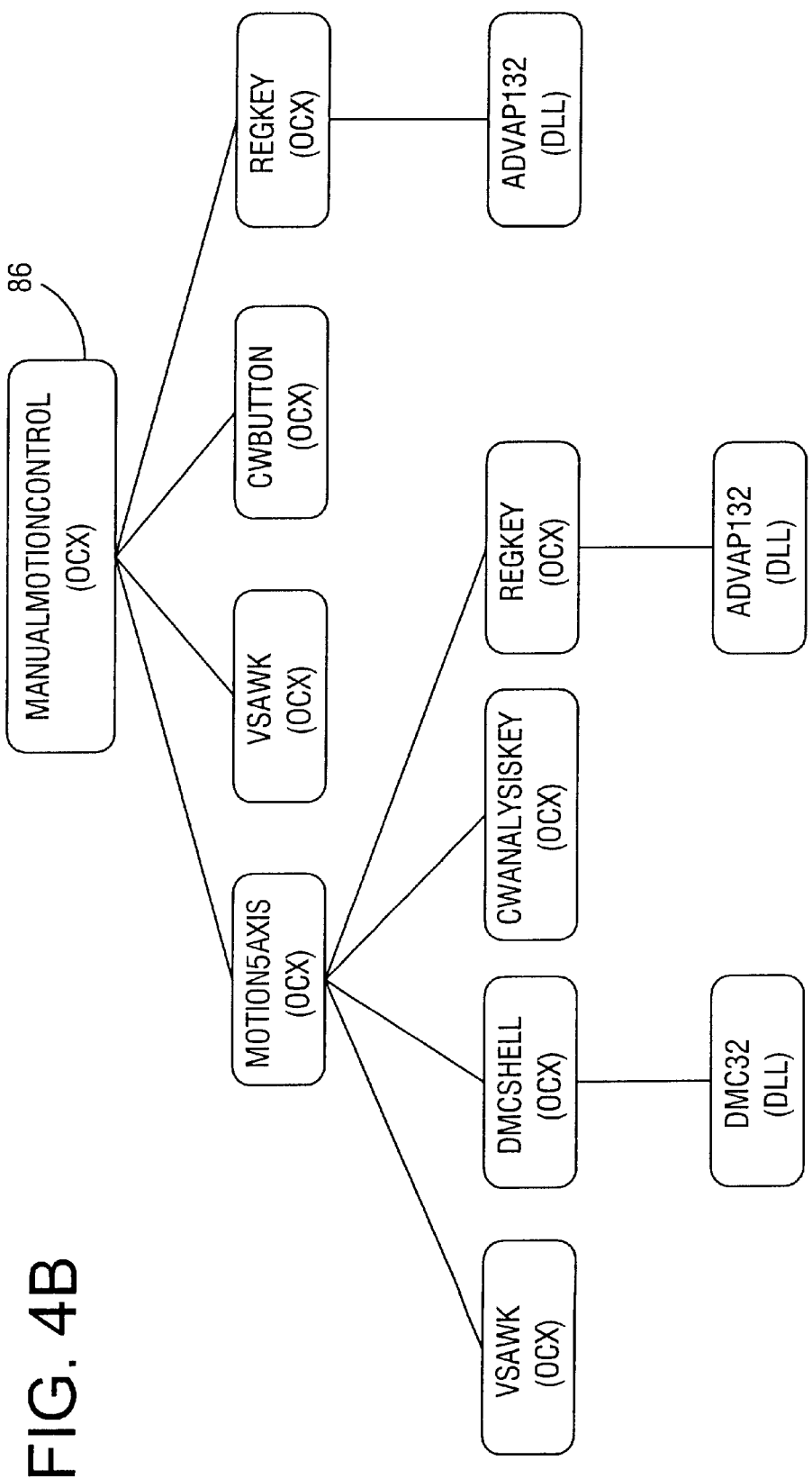
Figure 4C:
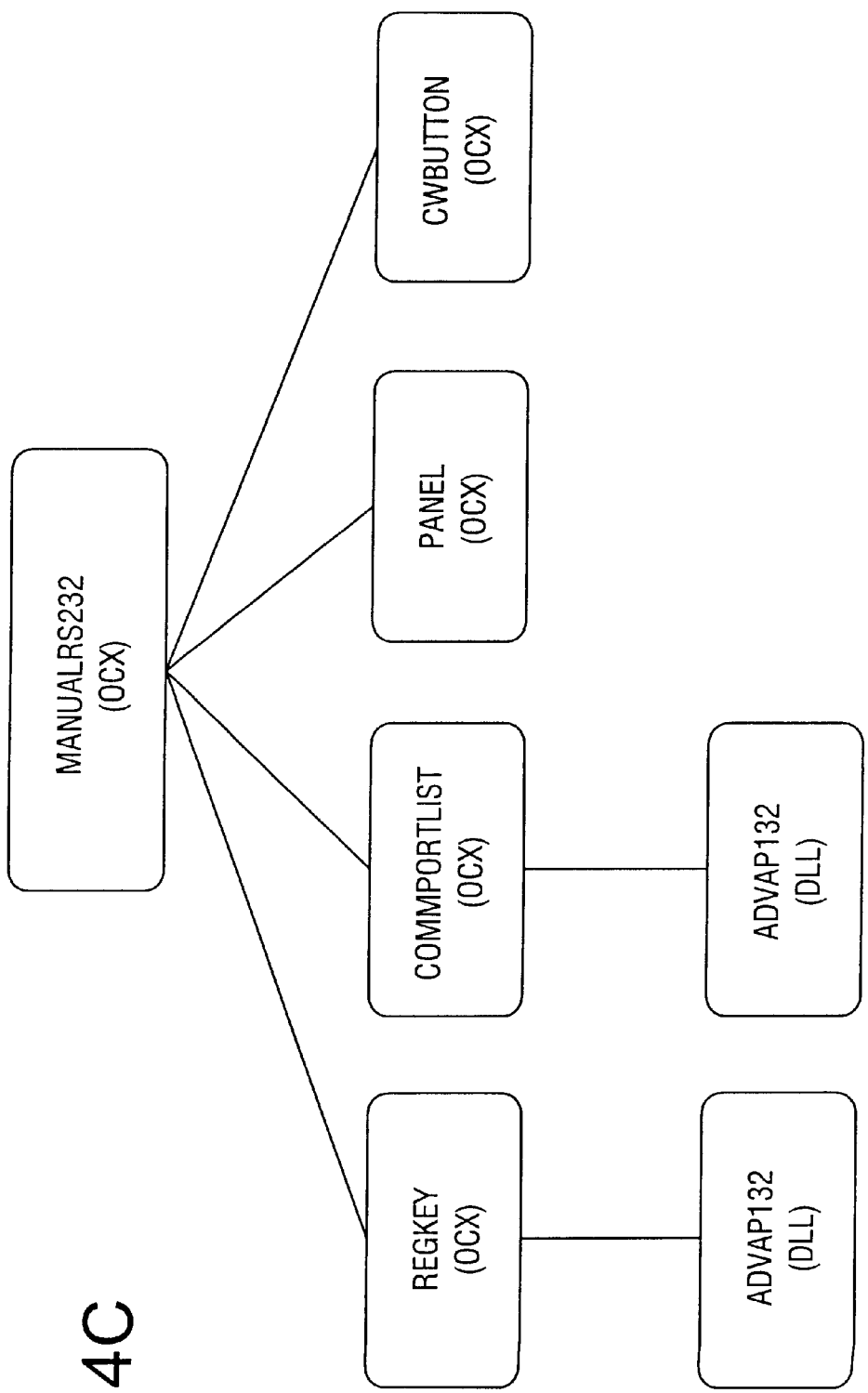
Figure 4D:
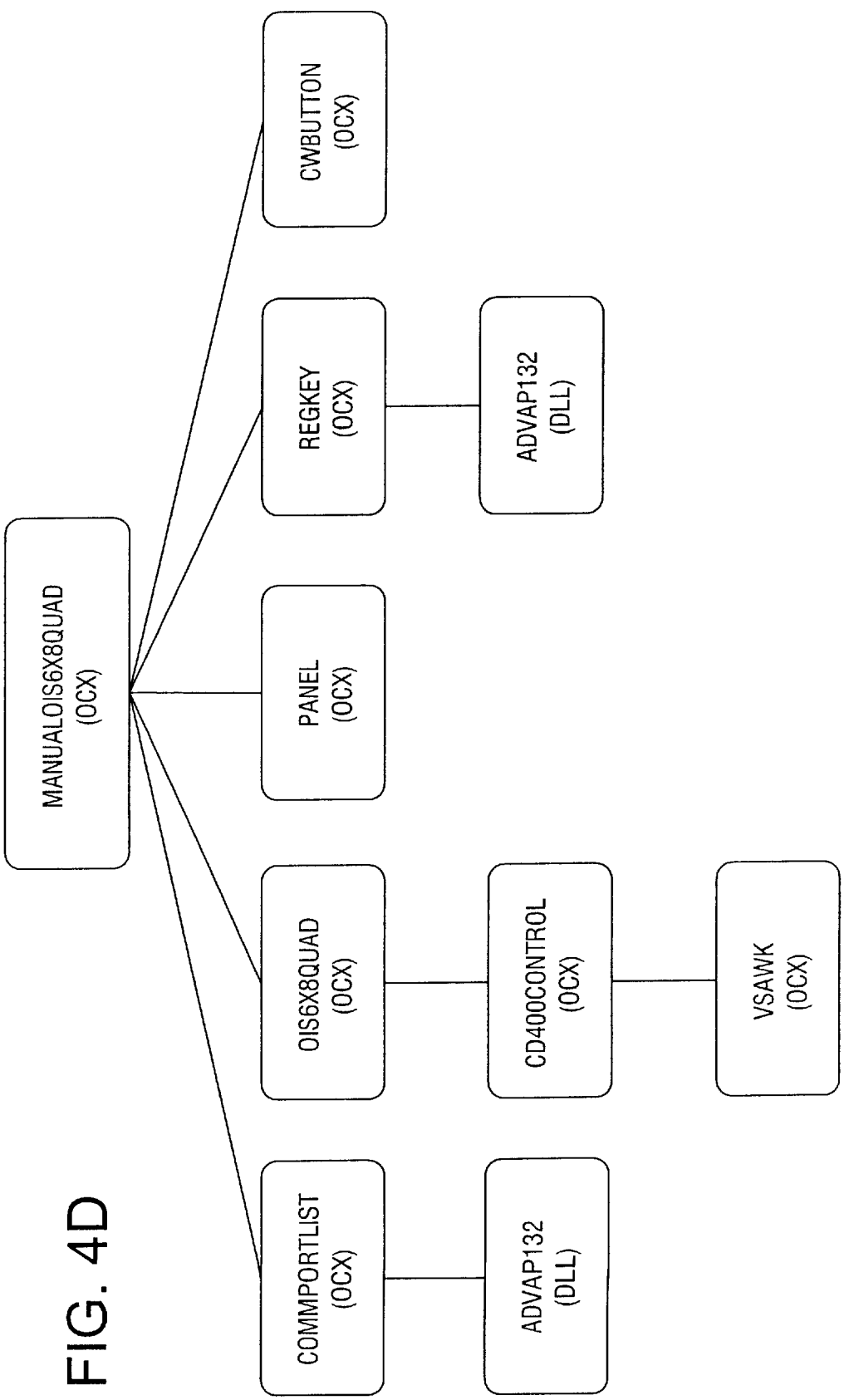
Figure 4E:
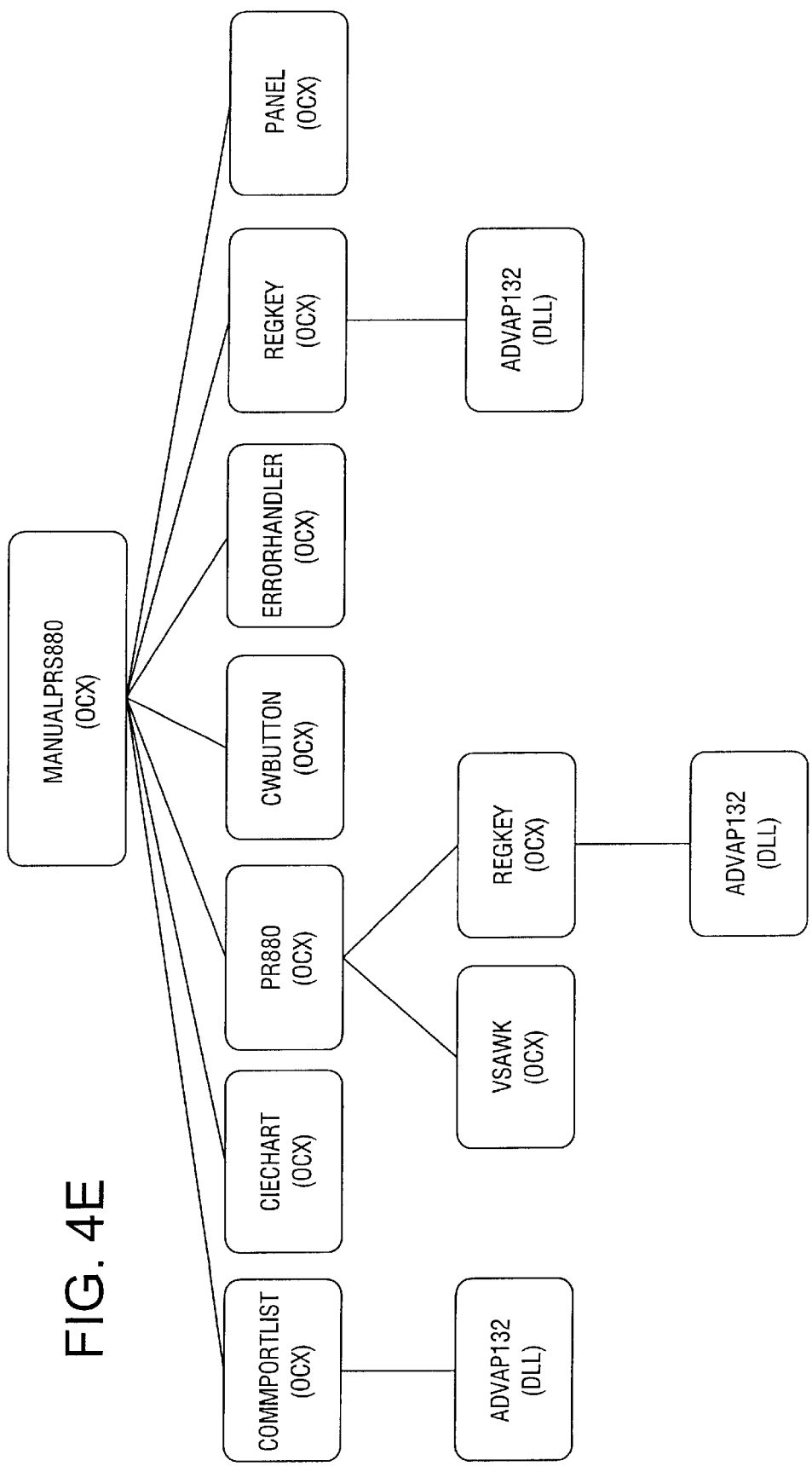
Figure 4F:
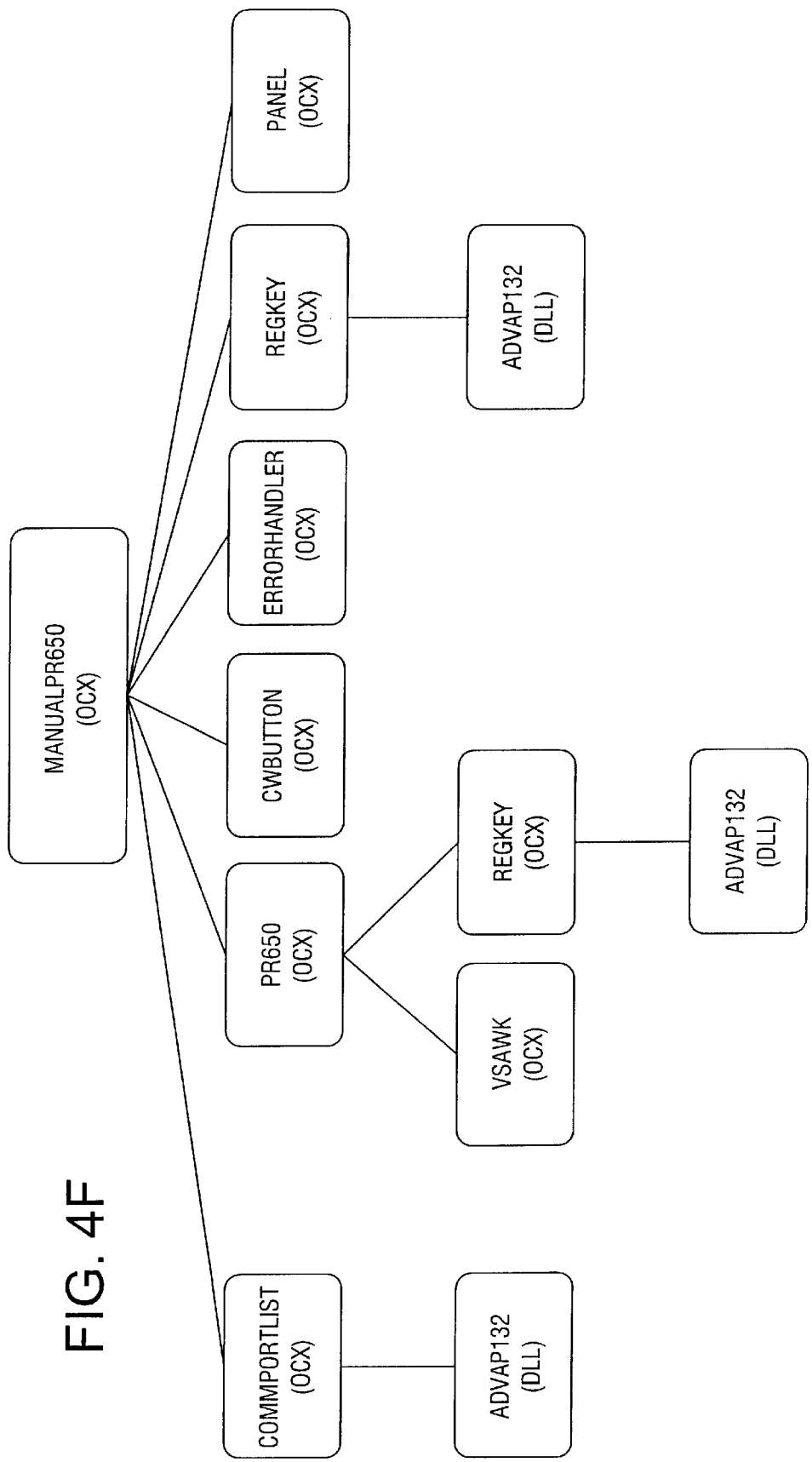
Figure 4G:
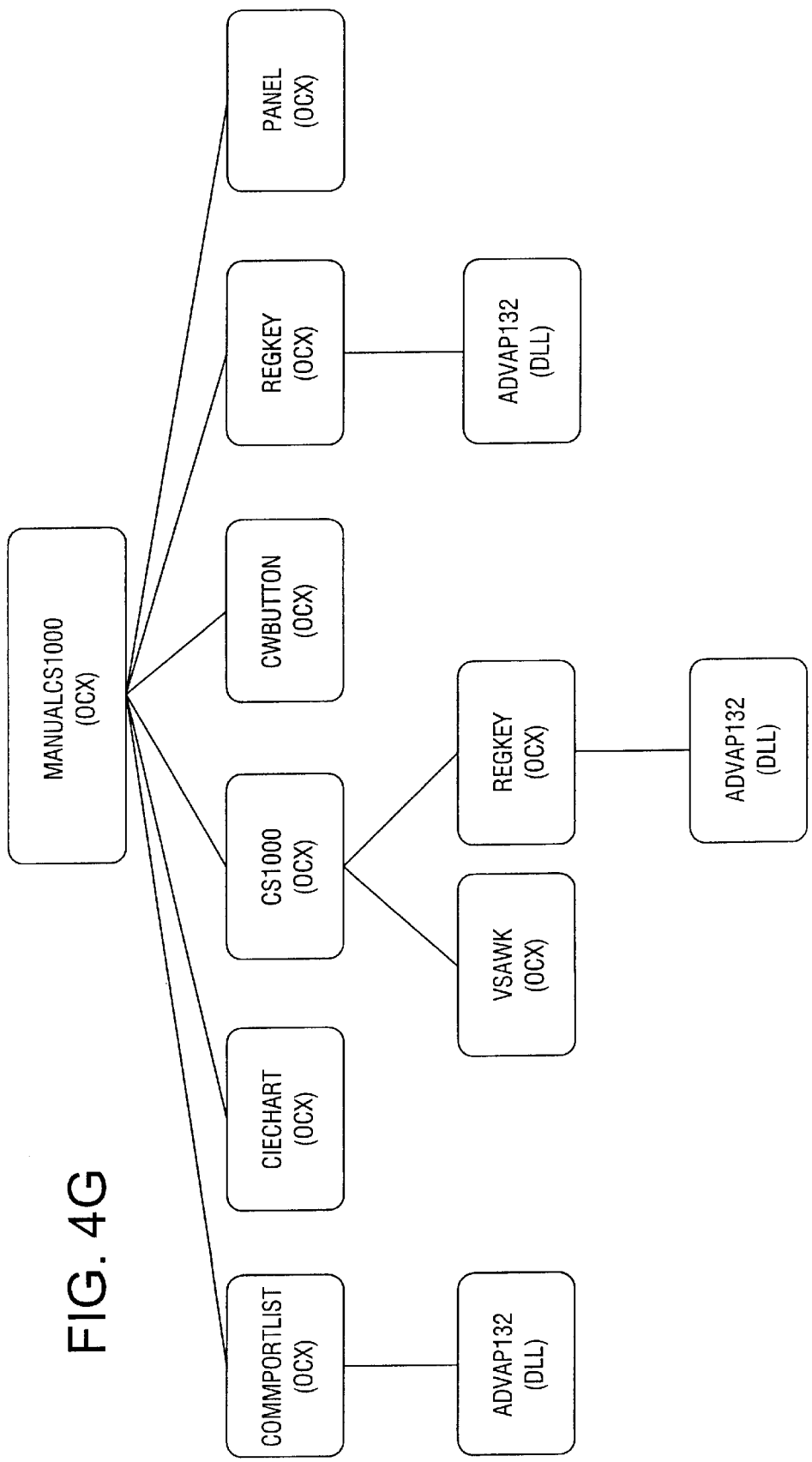

FIG. 3 diagrammatically illustrates DUT 12 relative to a preferred coordinate system according to the invention. As shown, an origin position (x,y,z)=(0,0,0) is defined relative to the goniometer pivot point (i.e., the intersection of the elevation axis 42 and the azimuth axis 44 of rotational stage 22). In general, system 10 moves LMD 18 in a three-dimensional x,y,z space relative to this origin position. From the view of LMD 18, +x is to the right, +y is upward, and +z is backward, away from DUT 12. By definition, the elevation rotary table 36 of rotational stage 22 tips DUT 12 by a positive tip angle a in the forward direction and the azimuth rotary table 38 of rotational stage 22 turns DUT 12 by a positive turn angle β to the right. Thus, a position $(x,y,z)=(0,0,z_{LMD})$ defines a home position for LMD 18 where its line of sight, or optical axis, passes through the goniometer pivot point. As an example, the distance $z_{LMD}$ is about 24 inches.

To ensure accurate positioning of DUT 12 and LMD 18 during use, the user aligns system 10 following its assembly. First, the user aligns LMD 18 (as well as any additional optical instrument(s)) to the z-axis of travel. In other words, the instrument line of sight, or optical axis, is substantially parallel to the defined z-axis. Then, the user zeroes system 10. Zeroing consists of moving LMD 18 to a predefined origin $(x,y,z)=(0,0,z_{LMD})$ and moving the goniometer tip and turn angles such that the instrument optical axis intersects the goniometer pivot point and the goniometer backboard 60 is normal to the optical axis of LMD 18

In general, this alignment procedure uses the principle that two parallel rays will intersect a target plane at two points and the distance between the two points will remain constant regardless of the position of the plane along the lines. If the lines are divergent (or convergent) the distance between the two points will vary as the plane position changes. For example, the z-axis of travel forms a reference line to which the optical axis of LMD 18 is to be made parallel. The target plane is the goniometer backboard 60. Using an alignment target on backboard 60, the user moves LMD 18 until it is centered in x and y.

In one preferred embodiment of the invention, LMD 18 may be aligned in the vertical plane (i.e., the YZ plane) by first moving its z-position inward (negative) toward rotational stage 22 to the travel limit of linear table 30. Then, the user adjusts the instrument focus and diopter settings to obtain a clear sight picture of an alignment target on backboard 60 and moves the x and y positions of LMD 18 such that the instrument aperture is centered on the alignment target. These y and z positions define $y_1$ and $z_1$. The user then moves LMD 18 outward (positive) away from rotational stage 22 to the travel limit. Again, the user adjusts the instrument focus and diopter settings to obtain a clear sight picture of the alignment target and moves the x and y positions of LMD 18 such that the instrument aperture is precisely centered on the alignment target. In this instance, the y and z positions define $y_2$ and $z_2$.

According to the alignment procedure, the amount needed to raise or lower the front end of the instrument is determined as a function of the slope between the first and second points (i.e., as a function of $(y_2-y_1)/(z_2-z_1)$. For example, an adjustment screw may be used at the front end of the instrument and the number of turns of the screw is a function of the slope. Alignment accuracy of better than +/−0.040 inch over a z-axis travel distance of approximately 29 inches is desired.

In general, the user repeats the alignment procedure to define $x_1$ and $x_2$ positions along the z-axis. Misalignment of the instrument optical axis from the z-axis in the x direction is removed by rotating the instrument in the XZ plane. In this instance, an x correction distance in the target plane may be calculated using similar triangles as follows:

$$\Delta x = z_{DIST}(x_1-x_2)/(z_2-z_1)$$

where $(z_2-z_1)$ is the same value used above in the vertical plane alignment and $z_{DIST}$ is the measured distance from the instrument's rotational point (e.g., a locking screw) to the target plane. To align the instrument in the horizontal plane, the origin position on the x-axis is moved by the $\Delta x$ correction distance (i.e., moved to $(x_2+\Delta x)$). The user can check alignment by rotating LMD 18 until the aperture is again precisely centered on the alignment target and repeating the steps described above to verify alignment.

If a secondary instrument is mounted on the translational stage 20, a similar alignment procedure may be used for aligning the secondary instrument with respect to the vertical and horizontal planes.

Following instrument alignment to the z-axis, the user preferably zeroes system 10. In other words, the user aligns each of the five axes such that the goniometer backboard 60 is normal to the optical axis of LMD 18 and the optical axis intersects the goniometer pivot point. The five "zero" positions are established by first driving all five axes to their home positions, then carefully moving each axis to an aligned "zero" position. In one embodiment, five magnetic home switches, located approximately at mid-travel for each axis, define the home positions. As an example, the user may use a flat mirror to zero rotational stage 22. The mirror will produce a reflection of the instrument lens centered in the instrument eyepiece when zeroed.

In one preferred embodiment, system 10 provides offsets for moving LMD 18 away from the defined zero position. For example, the user may wish to adjust the working z-distance of LMD 18 to provide a particular aperture spot size on the surface of DUT 12. Further, the offset feature of system 10 is particularly useful when using a secondary instrument because the initial zero positioning was performed relative to the primary instrument.

As is known in the art, those interested in the performance of a particular display usually measure such performance relative to a normal direction (i.e., perpendicular to the screen surface of DUT 12). Some displays, however, are designed to be viewed from a direction other than normal and others are designed for privacy so that they cannot be viewed from certain angles. For these reasons, testers of flat panel displays desire performance measurements from certain viewing angles. In general, viewing angles describe the angular position of the optical instrument line of sight (i.e., the optical axis of LMD 18) with respect to the surface of DUT 12. For example, viewing angles may be defined by a pair of orthogonal angles (tip angle $\alpha$ and turn angle $\beta$) or a pair of polar angles (inclination angle $\phi$ and azimuth angle $\theta$). The inclination angle $\phi$ describes the angle between the instrument line of sight and the normal axis of DUT 12 and the azimuth angle $\theta$ describes the instrument line of sight rotational angle around the face of DUT 12, starting at 0° at the +x-axis and increasing counter clockwise.

During operation, LMD 18 examines a particular spot, or region, on DUT 12. Unless this spot is located at the goniometer pivot point, the center of the spot will move relative to the field of view of LMD 18 when rotational stage 22 tips and/or turns DUT 12. According to the present invention, system 10 advantageously maintains an approximately uniform distance between LMD 18 and the region of interest on DUT 12. In other words, system 10 adjusts the position of LMD 18 in orthogonal space to account for azimuthal and/or elevational movement of the spot location by rotational stage 22. By tracking spot movement, system 10 advantageously maintains a uniform distance between LMD 18 and the spot on DUT 12 which in turn maintains focal length and approximate spot size. Further, tracking the spot location permits system 10 to examine generally the same spot on DUT 12 even as the viewing angle changes.

According to the present invention, system controller 52 executes software implementing an interface which transforms the coordinates of LMD 18 as a function of spot location movement. In this manner, system 10 maintains a uniform distance between LMD 18 and the region of interest and maintains the center of the region at a desired position on DUT 12 as it is tipped and/or turned in elevation and/or azimuth. In operation, a user sets the location of the region of interest and viewing angle of LMD 18 by specifying the x and y coordinates of the spot on DUT 12 as well as the angles (i.e., the tip and turn angles in orthogonal space or the azimuth and inclination angles in polar space). Preferably, one of the two display space views may be used if the user wishes to examine a display at known display coordinates or viewing angles.

With respect to orthogonal display space, the user enters x and y coordinates to specify the location of interest on the display surface. The orthogonal viewing angle is entered as a function of the tip angle $\alpha$ and the turn angle $\beta$ for driving motion stage 14. Origin offsets for x, y, and z may also by used to account for the origin position of DUT 12 relative to the goniometer pivot point. In most cases, DUT 12 is centered with respect to the x and y-directions and, thus, these offset values are zero. The offset in the z-direction refers to the distance from the goniometer pivot point to the surface of DUT 12.

With respect to polar display space, the user also enters x and y coordinates to specify the location of interest on the display surface. The polar viewing angle is entered as a function of the inclination angle $\phi$ and the azimuth angle $\theta$ for driving motion stage 14. As an example, the inclination angle from the display normal ranges from 0° to 90° and the rotational azimuth angle around the face of the display ranges from 0° to 360°. In this instance, the origin offsets for x, y, and z are entered if the center of DUT 12 does not coincide with the goniometer pivot point.

As described above, system controller 52 transforms the coordinates of LMD 18 as a function of spot location movement to maintain a uniform distance between LMD 18 and the region of interest and to maintain the center of the region at a desired position on DUT 12. In one embodiment, system controller 52 uses seven equations to solve three different coordinate transformation problems.

The first transformation solution provided by system controller 52 involves defining the location of a point on the display surface of DUT 12 in three-dimensional space relative to LMD 18 as rotational stage 22 tips and turns DUT 12. In general, equations (1), (2), and (3), below, define new x", y", and z" coordinates of the point on the display surface of DUT 12 after it is tipped and turned. The position of LMD 18 relative to the x,y,z coordinate system may then be adjusted accordingly. System 10 employs this transformation when examining spots on DUT 12 from non-normal viewing angles and when the spots are away from the pivot point (x,y,z)=(0,0,0). On the other hand, spots at the pivot point do not translate when rotational stage 22 moves DUT 12. Since DUT 12 need not be mounted in the plane of the pivot point (e.g., offset by +Δz toward LMD 18), system 10 also accounts for translation of the display center in these circumstances.

As an example, assume DUT 12 is centered with respect to x and y and its front surface is forward of the pivot point by one inch. Since viewing angle tests are usually carried out at the center of the display, a unit vector (0,0,1) coaxial with the +z-axis locates this spot on the display surface of DUT 12. During testing from non-normal viewing angles, elevation rotary table 36 first tips backboard 60 about elevation axis 42 (i.e., the x-axis) by an angle α to tip DUT 12. At this position, system controller 52 defines an intermediate transformation vector Z' normal to the viewable surface of DUT 12. Second, azimuth rotary table 38 turns about azimuth axis 44 (i.e., the y-axis) by an angle β to turn DUT 12. This yields a final transformation vector Z" normal to the tipped and turned DUT 12. Applying the coordinate rotation equations to impart the goniometer tipping and turning angles to the +z-axis unit vector Z, defines the new vector Z"=(x",y",z"). In this example, the vector Z is in the direction of the optical axis, or line of sight, of LMD 18 and positive rotations are counterclockwise about the respective axis of rotation.

Further to the example, the transformation vectors may be expressed in vector notation as follows:

$$[Z'] = \begin{bmatrix} x' \\ y' \\ z' \\ 1 \end{bmatrix} = [R_x][Z]$$

$$[Z''] = \begin{bmatrix} x'' \\ y'' \\ z'' \\ 1 \end{bmatrix} = [R_y][Z']$$

where $R_x$ is the transformation matrix used when rotating about the x-axis and $R_y$ is the transformation matrix used when rotating about the y-axis.

According to one preferred embodiment of the invention, the transformation matrices used in determining the transformation vectors are as follows:

$$[R_x] = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$[R_y] = \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix}$$

Thus, the transformation vectors may be expressed in vector notation as follows:

$$[Z'] = \begin{bmatrix} x \\ y\cos\alpha - z\sin\alpha \\ y\sin\alpha + z\cos\alpha \\ 1 \end{bmatrix}$$

$$[Z''] = \begin{bmatrix} x'\cos\beta + z'\sin\beta \\ y \\ z'\cos\beta - x'\sin\beta \\ 1 \end{bmatrix}$$

Substituting x', y', and z' into the above matrices yields the following transformation equations for defining the component coordinates of the final transformation vector Z":

$$x''= x\cos\beta + (y\sin\alpha + z\cos\alpha)\sin\beta \quad (1)$$

$$y'' = y\cos\alpha - z\sin\alpha \quad (2)$$

$$z'' = (y\sin\alpha + z\cos\alpha)\cos\beta - x\sin\beta \quad (3)$$

As illustrated by FIG. 3, vectors X, X", Z and $Z_{xz}$ all lie in the XZ plane; vectors Y, Y", Z" and $Z''_{xz}$ all lie in the Y"Z" plane; and vectors Z, Z" and V all lie in the Z"Z plane. Further, the angle between vectors $Z''_{xz}$ and Z" defines the tip angle α; and the angle between vectors $Z''_{xz}$ and Z defines the turn angle β. By definition, the angle between vectors Y and $Z''_{xz}$ and the angle between vectors Y" and Z" are both 90°.

The system controller 52 also transforms the two orthogonal goniometer angles α and β into two polar angles for graphically representing luminance measurements versus viewing angle. Equations (4) and (5), below, define an off-normal polar angle φ and an around-the-clock polar angle θ which together represent an equivalent viewing angle obtained by the goniometer angles α (elevation tipping) and β (azimuth turning).

In general, two-dimensional polar plots raphically represent luminance readings taken at the center of DUT 12 from various viewing angles (i.e., the angle of the line of sight of LMD 18 with respect to the display surface normal axis). Such polar plot concentric circles mark the off-normal angle φ and the radial lines mark the position θ of the line of sight around the display. By definition, the angle φ is always positive between 0° and 90° and the angle θ ranges from 0° to ±180°, where positive θ values lie in display quadrants 1 and 2 (i.e., the upper half of DUT 12) and negative θ values lie in display quadrants 3 and 4 (i.e., the lower half of DUT 12). The positive axis defined by the vector X" defines θ=0°.

In one preferred embodiment, system controller 52 obtains the angle φ based on the angle between vectors Z and Z". The cosine of the angle φ between the two vectors is defined as:

$$\cos\phi = (Z \cdot Z'')/|Z||Z''|$$

where Z·Z" is the dot product of the two vectors, a scalar value; and $$Z \cdot Z'' = (xx'' + yy'' + zz'')$$

where x, y, z are the components of vector Z and x", y", z" are the components of vector Z" as defined by equations (1), (2) and (3), above. In this instance, Z and Z" are both unit vectors (i.e., $|Zi|=|Z''|=1$). In particular, $Z=(0,0,1)$. Therefore, using equation (3), above, the inclination angle $\phi$ becomes:

$$\phi = \cos^{-1}(zz'') = \cos^{-1}(\cos \alpha \cos \beta) \qquad (4)$$

In this instance, for $\alpha=\beta=0°$, the resulting $\phi=0°$ and if either $\alpha$ or $\beta=\pm 90°$, the $\cos^{-1}$ argument=0° and the resulting $\phi=90°$.

According to the invention, system controller 52 determines the angle $\theta$ by first computing the cross product of vectors Z and Z". This cross product, defined as vector P, is perpendicular to both vectors Z and Z" and lies in both the XY and the X"Y" planes. The vector P defines the line formed by the intersection of the original (normal) display plane and the tipped/turned display plane.

In equation form, system controller 52 computes:

$$P = Z \times Z''$$

where $$P_x = (yz'' - zy'')$$

$$P_y = (zx'' - xz'')$$

$$P_z = (xy'' - yx'')$$

After computing the cross product vector P, system controller 52 computes the cross product of vectors Z" and P. This cross product, defined as vector V, is perpendicular to both vectors Z" and P and lies in both the X"Y" and ZZ" planes. Further, the vector V represents the projection of vector Z onto the plane defined by vectors X" and Y" and, thus, defines the line formed by the intersection of these two planes.

In equation form, system controller 52 computes:

$$V = Z'' \times P$$

where $$V_x = (y''P_z - z''P_y)$$

$$V_y = (z''P_x - x''P_z)$$

$$V_z = (x''P_y - y''P_x)$$

In this embodiment, the angle between vectors V and X" defines the polar angle $\theta$. In general:

$$\cos \theta = (V \cdot X'') / |V| \, |X''|$$

As described above, the vector X" is the reference axis ($\theta=0°$) for the viewing angle polar plot component measured around DUT 12. Since the angle between vector V and the transformed positive x-axis defined by vector X" is independent of magnitude, system controller 52 defines a unit vector UX" as the reference vector. Since the vectors X and X' are equal, the unit vector UX" may be determined as a function of the angle $\beta$ in terms of a unit vector UX.

$$[UX''] = [R_y] [UX]$$

Since $UX=(1,0,0)$, the components of the unit vector UX" are as follows:

$$UX''_x = \cos \beta$$

$$UX''_y = 0$$

$$UX''_z = -\sin \beta$$

By definition, the magnitude of vector UX" is always equal to unity but the magnitude of vector V is not. From the general equation:

$$\theta = \cos^{-1}(V \cdot UX'' / |V|) \qquad (5)$$

where $$V \cdot UX'' = (V_x UX''_x + V_y UX''_y + V_z UX''_z)$$

$$|V| = (V_x^2 + V_y^2 + V_z^2)^{1/2}$$

In a preferred embodiment of the invention, system controller 52 corrects the sign of the angle $\theta$ for proper quadrant location as well as corrects divide-by-zero errors and other boundary condition problems obtained under certain conditions by performing an exception handling operation. For example, the above equation for calculating the angle $\theta$ always yields a positive value. For this reason, system controller 52 assigns a negative sign to $\theta$ when the line of sight of LMD 18 is below the display axis defined by vector X" for plotting the lower half of a polar luminance chart. This is accomplished by assigning the polar angle $\theta$ the same sign as the goniometer tipping angle $\alpha$.

Further, for $\alpha=\beta=0°$, $|V|=0$ which causes a divide-by-zero error in the argument of the inverse cosine function. Also, due to accuracy limitations in the computation of the inverse cosine argument, a value greater than +1 or less than −1 may cause an error. System controller 52 executes an inverse cosine argument function, INVCOSARG, which modifies the inverse cosine argument if it is an illegal value to handle these exceptions. In general, system controller 52 executes INVCOSARG to set the argument value equal to +1 if the value is greater than +1 and to set the argument value to −1 if the value is less than −1. In a preferred embodiment, the INVCOSARG function also sets the value of the argument to one if $|V|=0$.

In the reverse, system controller 52 advantageously calculates goniometer angles $\alpha$ and $\beta$ given polar angles $\phi$ and $\theta$. Equations (6) and (7), below, define the transformed angles $\alpha$ and $\beta$ as a function of the polar angles $\phi$ and $\theta$.

As described above, the angles $\phi$ and $\theta$ define the location of the line of sight of LMD 18 with respect to the display surface normal axis of DUT 12 in a polar coordinate system based on the surface. As before, the vector Z" defines the normal axis of DUT 12 after tipping and turning. System controller 52 first re-defines the coordinates for the vector Z" as (0,0,1) in display space and converts the line of sight vector's polar coordinates to Cartesian coordinates. In particular:

$$x = \sin \phi \cos \theta$$

$$y = \sin \phi \sin \theta$$

$$z = \cos \phi$$

Thus, the XY plane orthogonal to the line of sight vector Z may be defined in terms of the Z vector and the point (0,0,0) as follows:

$$x \sin \phi \cos \theta + y \sin \phi \sin \theta + z \cos \phi = 0$$

As described above, the angle $\beta$ is the angle between this plane and the axis defined by the vector X". Using the vector X" and a vector orthogonal to the XY plane (i.e., the vector Z), the angle $\beta$ is defined as follows:

$$\beta = \pi/2 - \angle(X'',Z) = \pi/2 - \cos^{-1}[X'' \cdot Z/|X''||Z|]$$

Substituting (1,0,0) for the vector X", (x,y,z) from above for the vector Z, and +1 for |X"||Z|, and correcting the sign, the equation becomes:

$$\beta = \cos^{-1}[\sin\phi \cos\theta] - \pi/2 \quad (6)$$

System controller 52 transforms the angle α from the polar angles φ and θ in a similar manner. In particular, system controller 52 defines the angle α in terms of a vector N normal to the plane defined by the vectors X" and Z as follows:

$$\alpha = \angle(Z'', X''Z \text{ plane}) = \pi/2 - \angle(Z'', N)$$

where N=X"×Z $$= [1,0,0] \times [\sin\phi \cos\theta, \sin\phi \sin\theta, \cos\phi]$$

$$= [0, -\cos\phi, \sin\phi \sin\theta]$$

Since Z"=(0,0,1), the tipping angle α becomes:

$$\alpha = \pi/2 - \cos^{-1}[\sin\phi \sin\theta/|N|] \quad (7)$$

where $$|N| = (\cos^2\phi + \sin^2\phi \sin^2\theta)^{1/2}.$$

Advantageously, system controller 52 accommodates for the situation when β=±90° by setting α=0°.

Referring now to the software executed by system controller 52, FIGS. 4A–4G, 5A–5Q, 6A–6E and 7 illustrate the operation of system 10 in the form of exemplary object diagrams. In a preferred embodiment of the invention, the system software utilizes object oriented programming technology and is written with, for example, Visual Basic, Microsoft COM (Component Object Model) technology or Microsoft ActiveX technology. The object diagrams illustrate the software structure of system controller 52 in a hierarchical fashion and demonstrate the relationships between, and the re-use of, the programming objects.

Figure 5A:
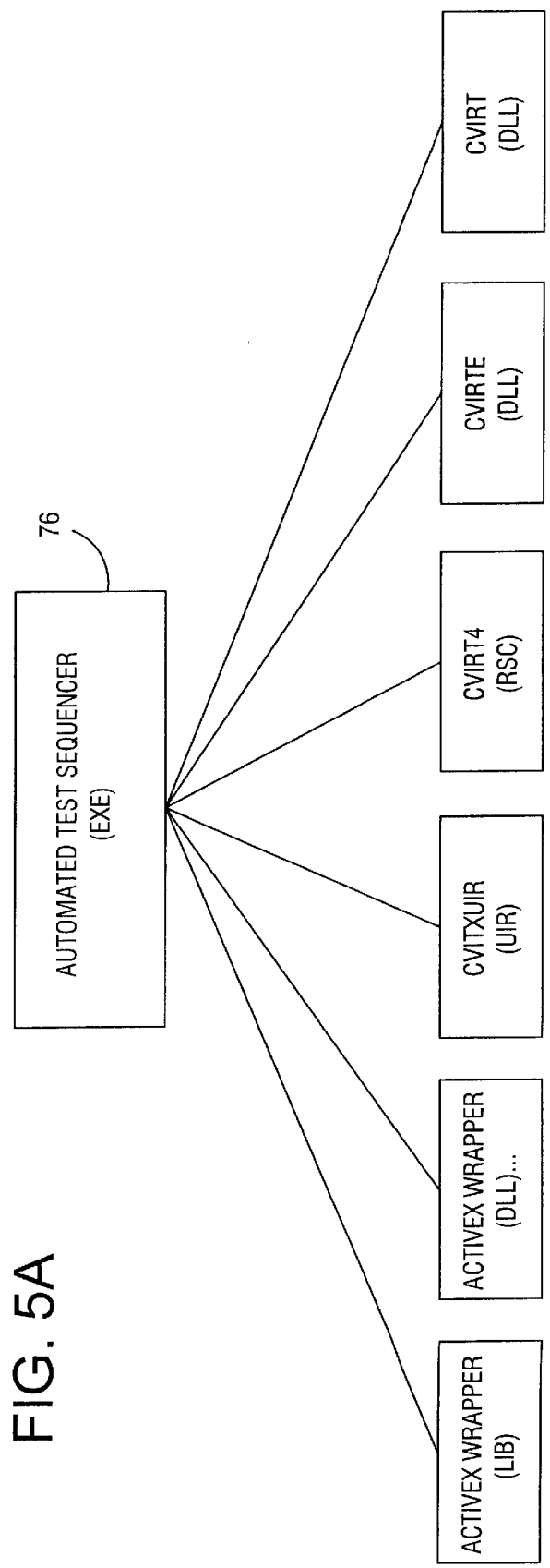
Figure 5B:
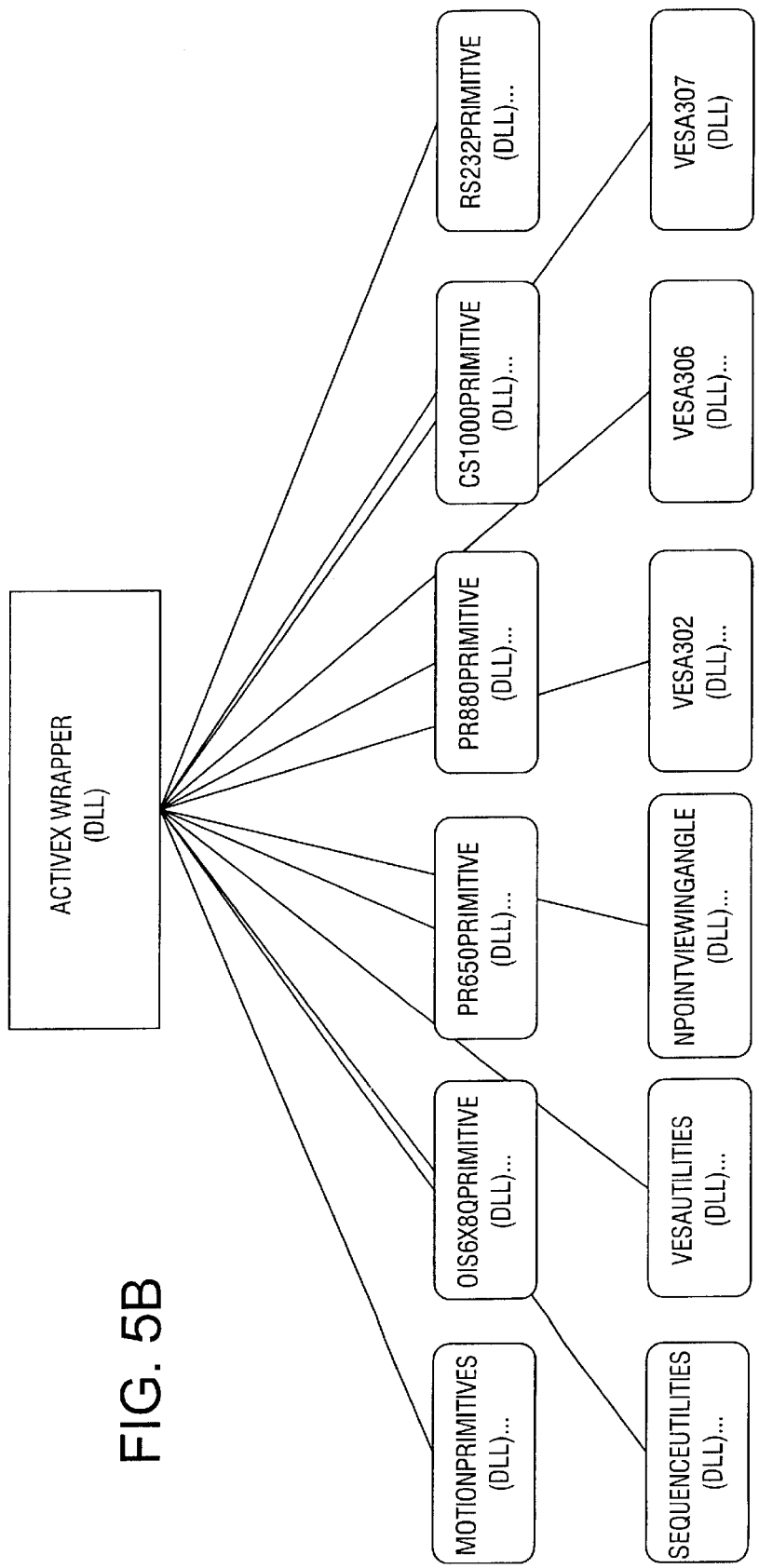
Figure 5C:
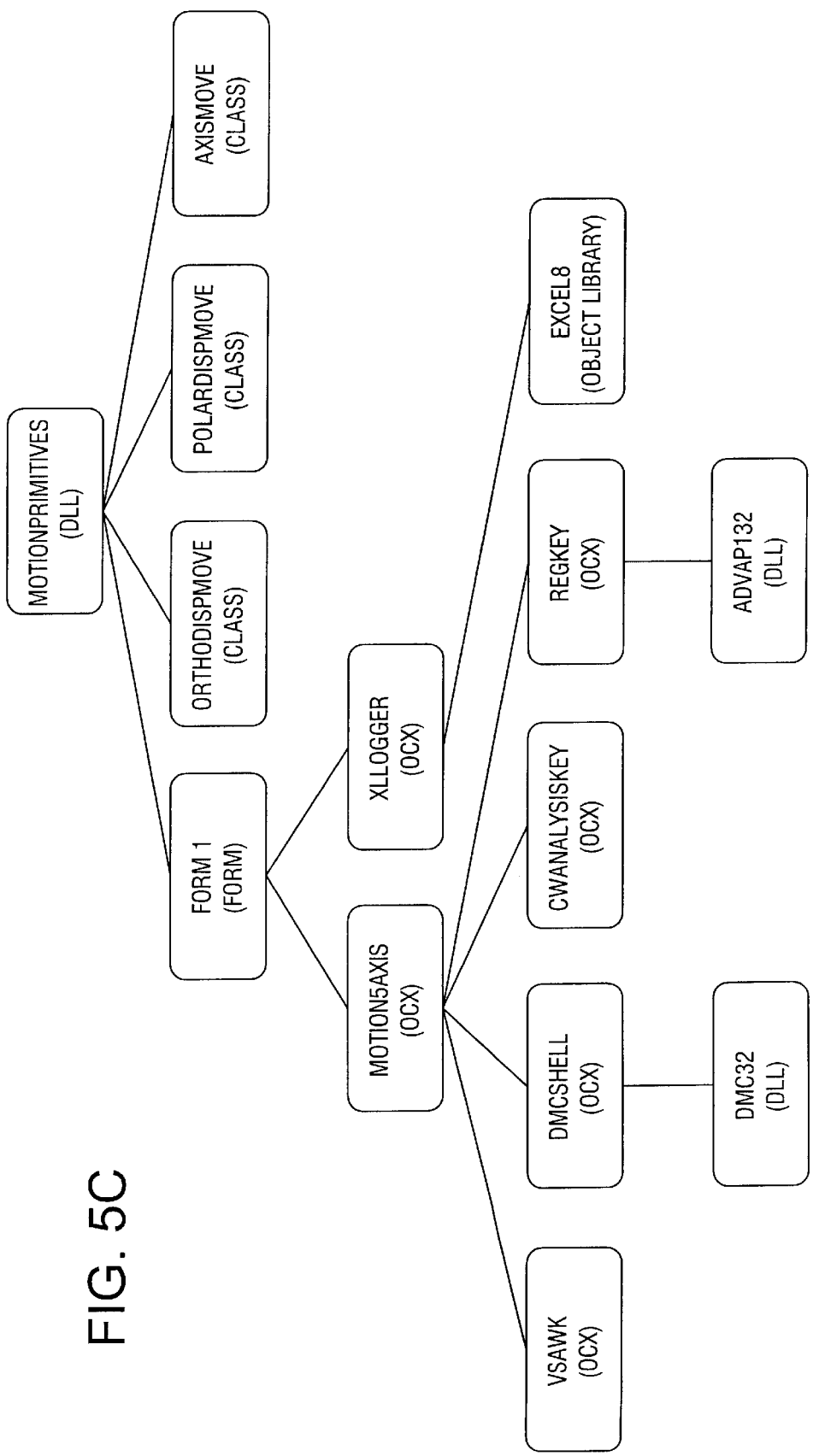
Figure 5D:
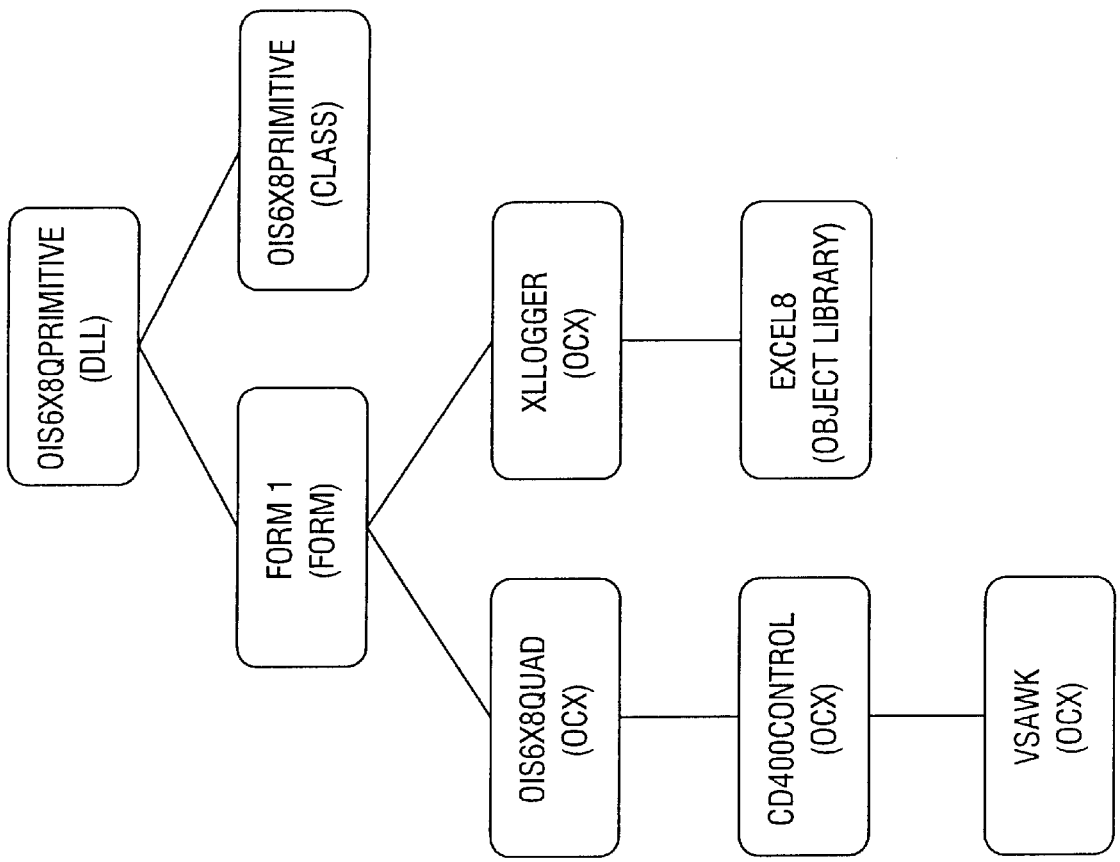
Figure 5E:
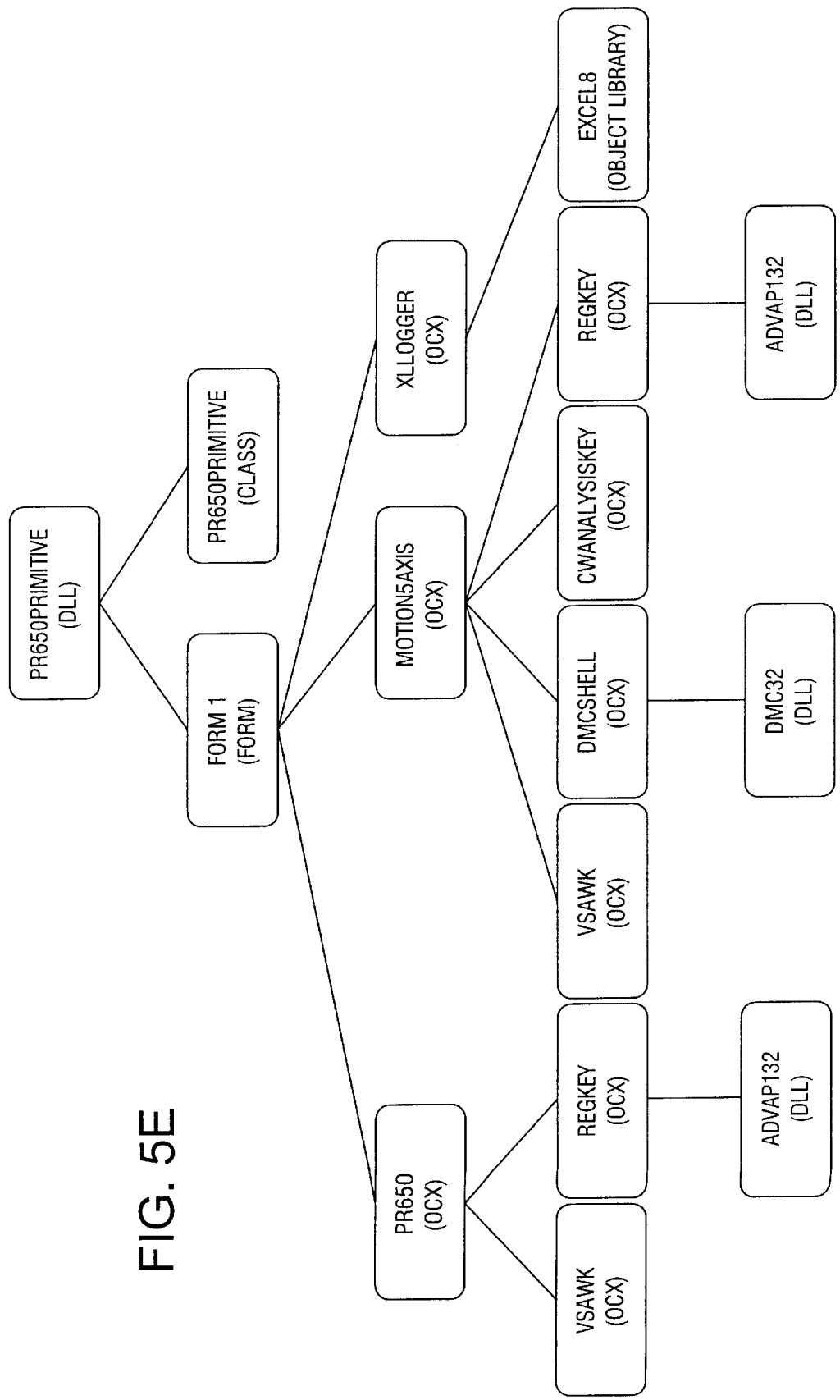
Figure 5F:
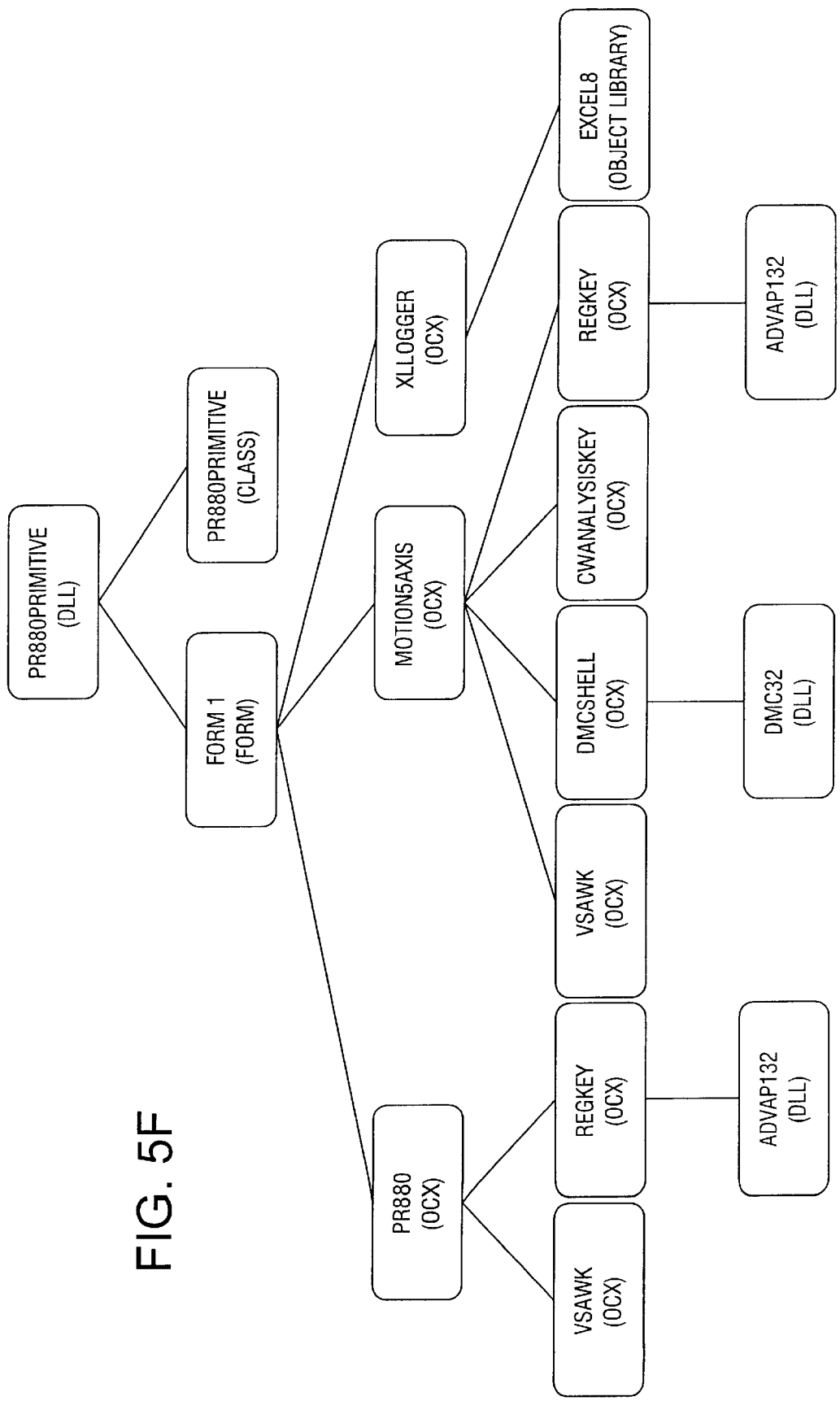
Figure 5G:
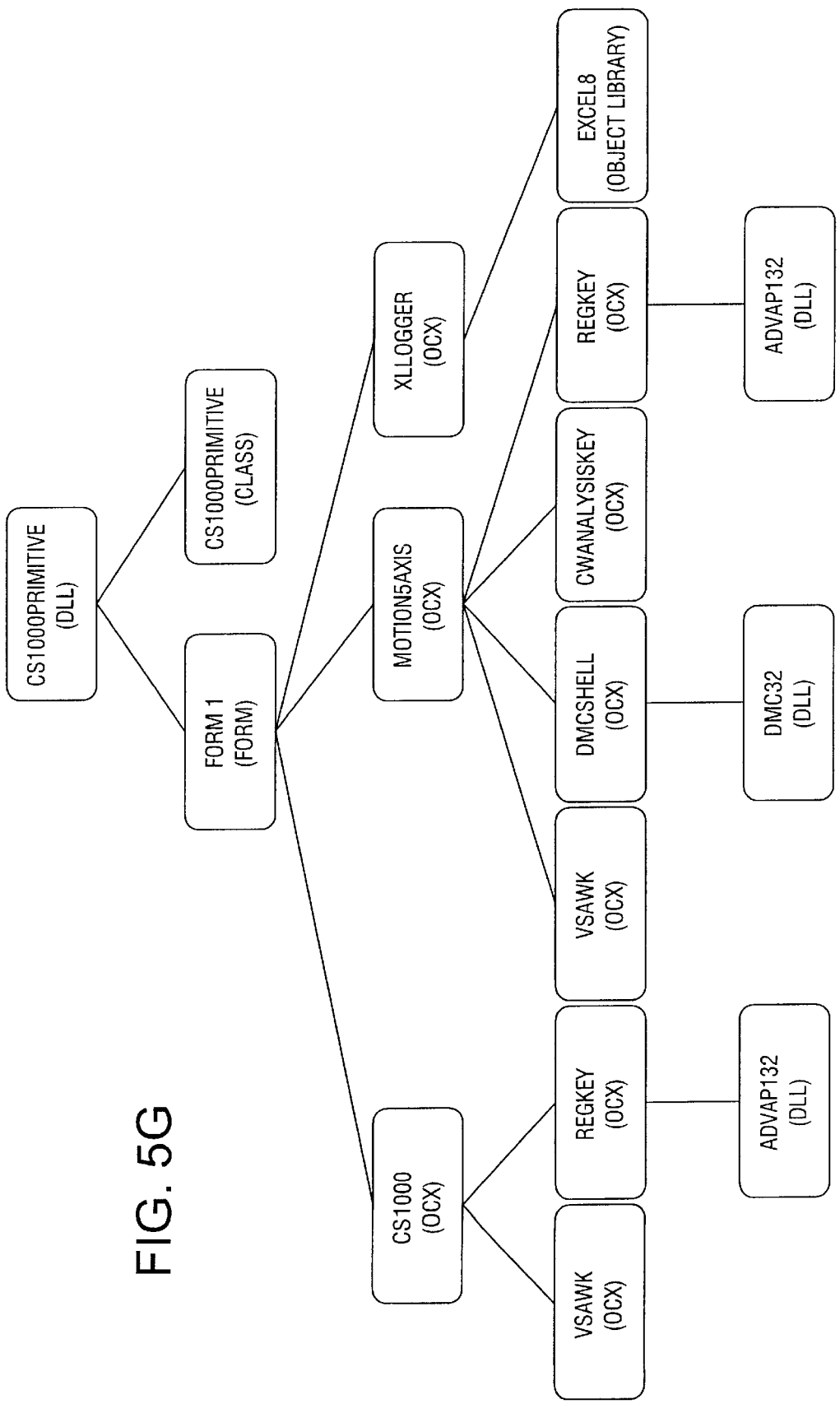
Figure 5H:
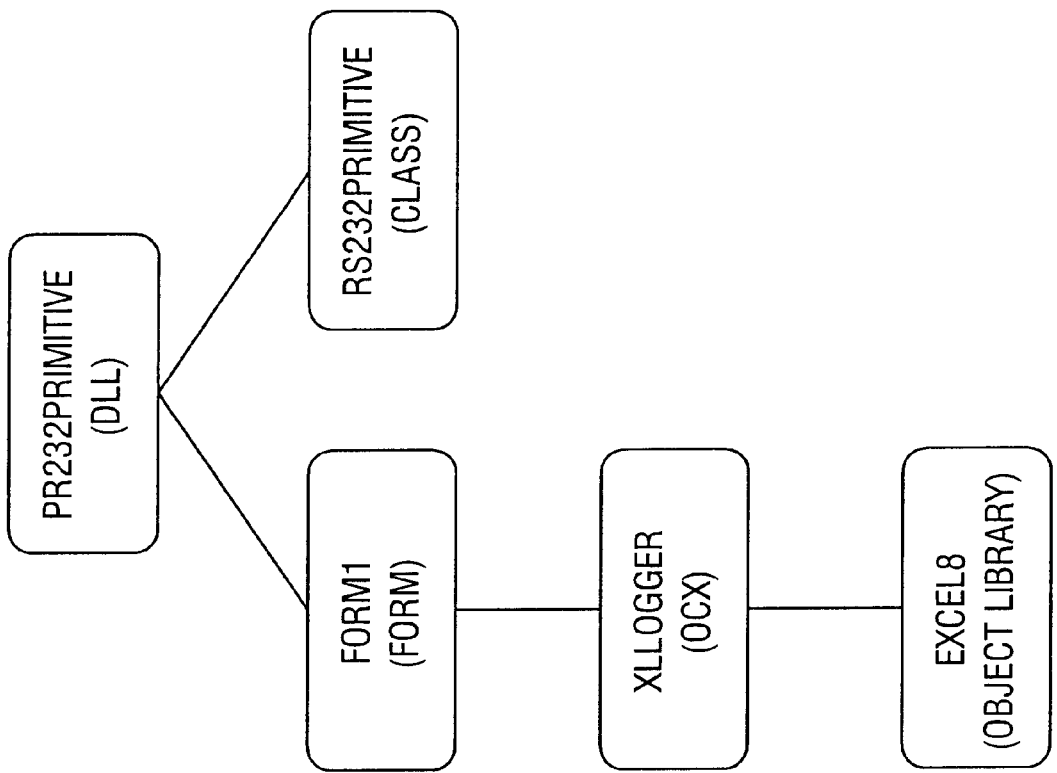
Figure 5I:
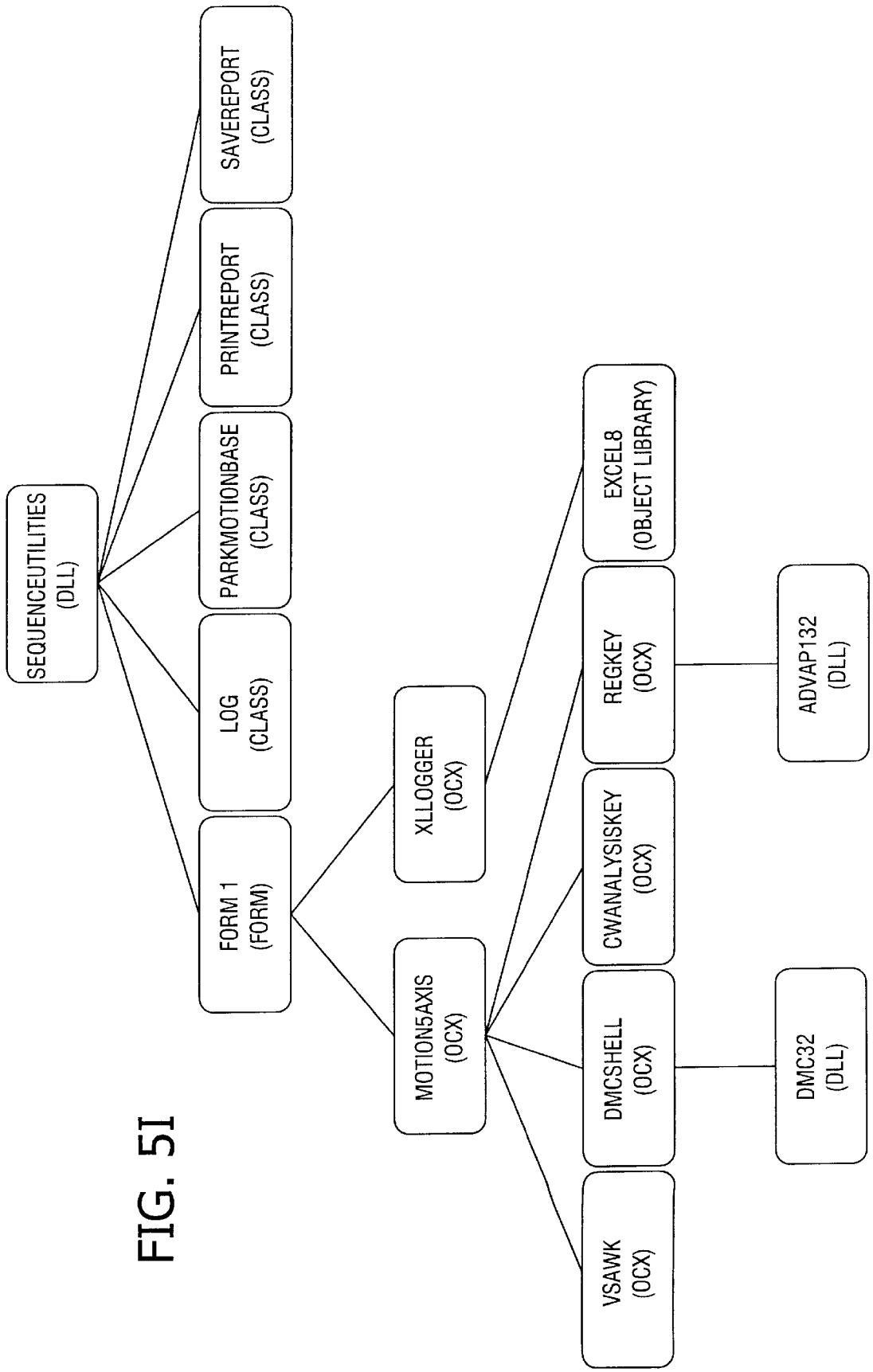
Figure 5J:
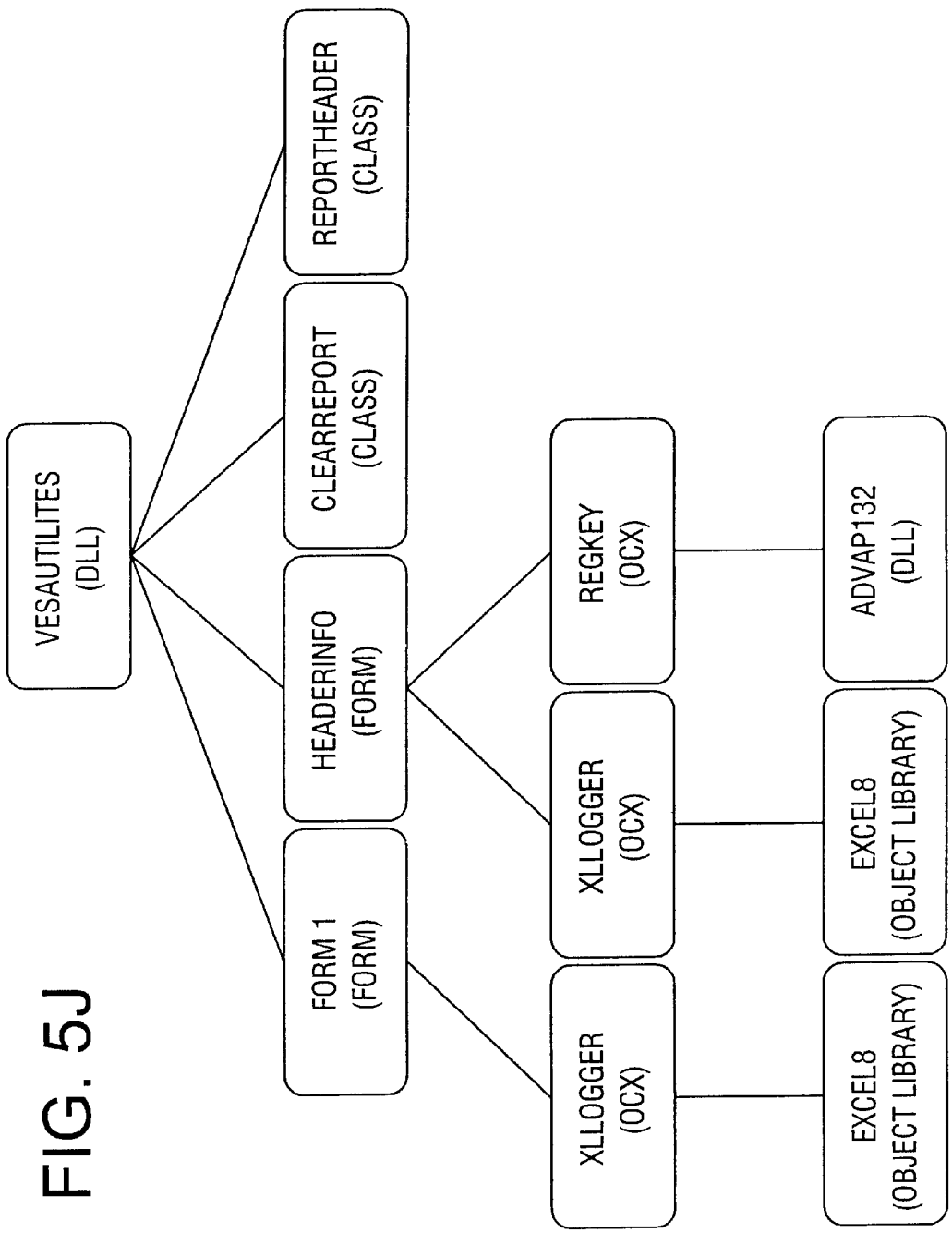
Figure 5K:
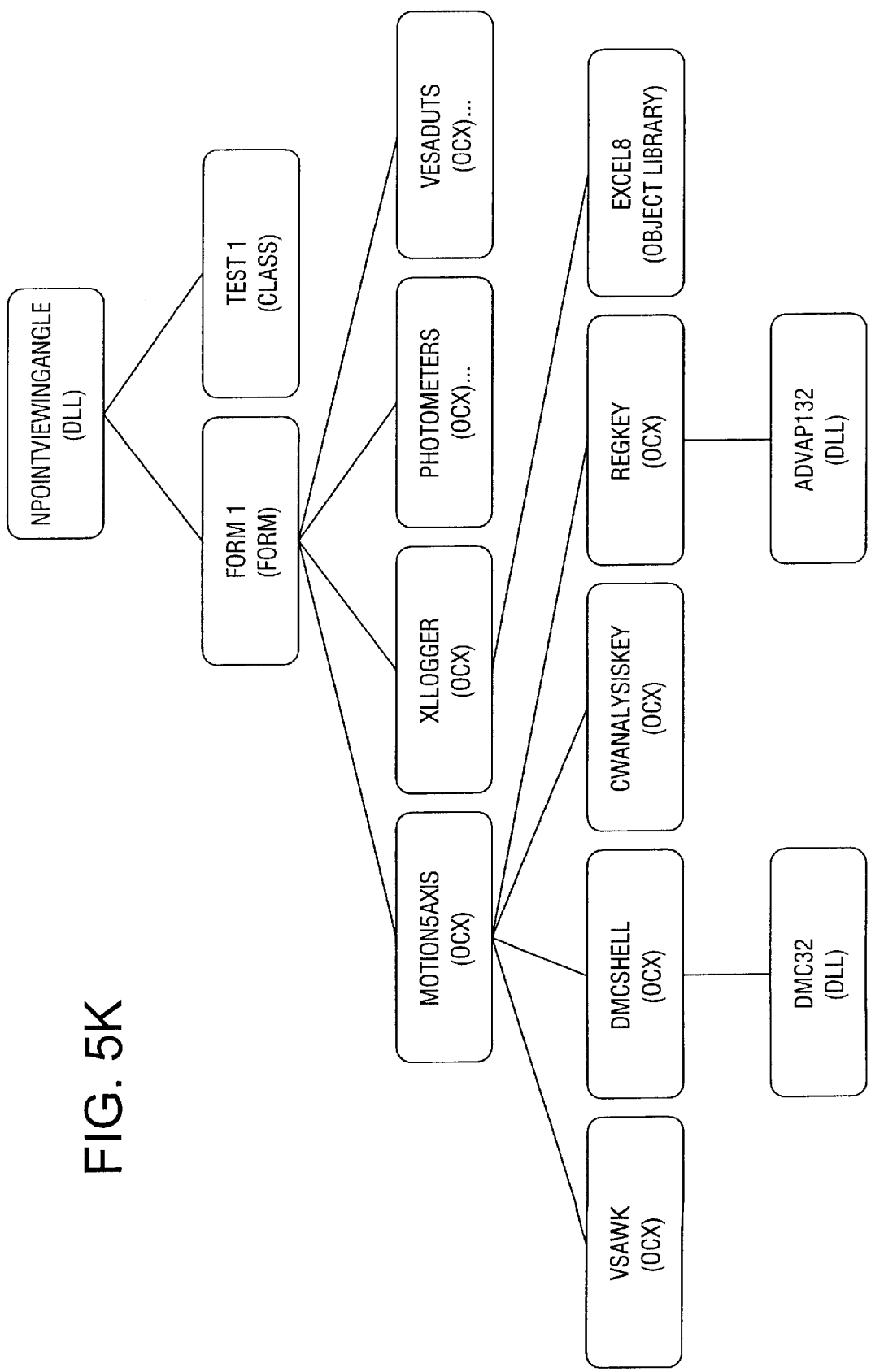
Figure 5L:
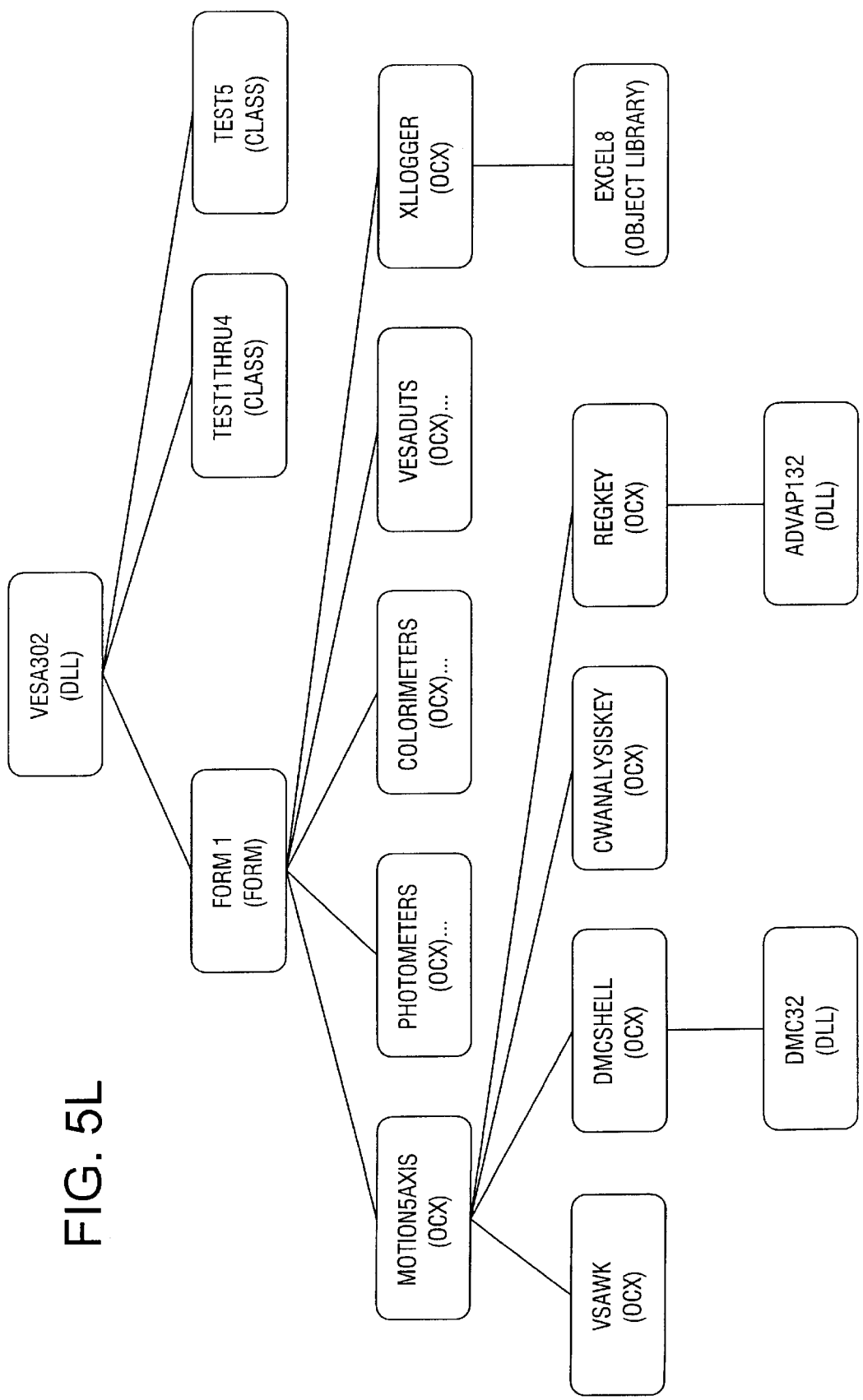
Figure 5M:
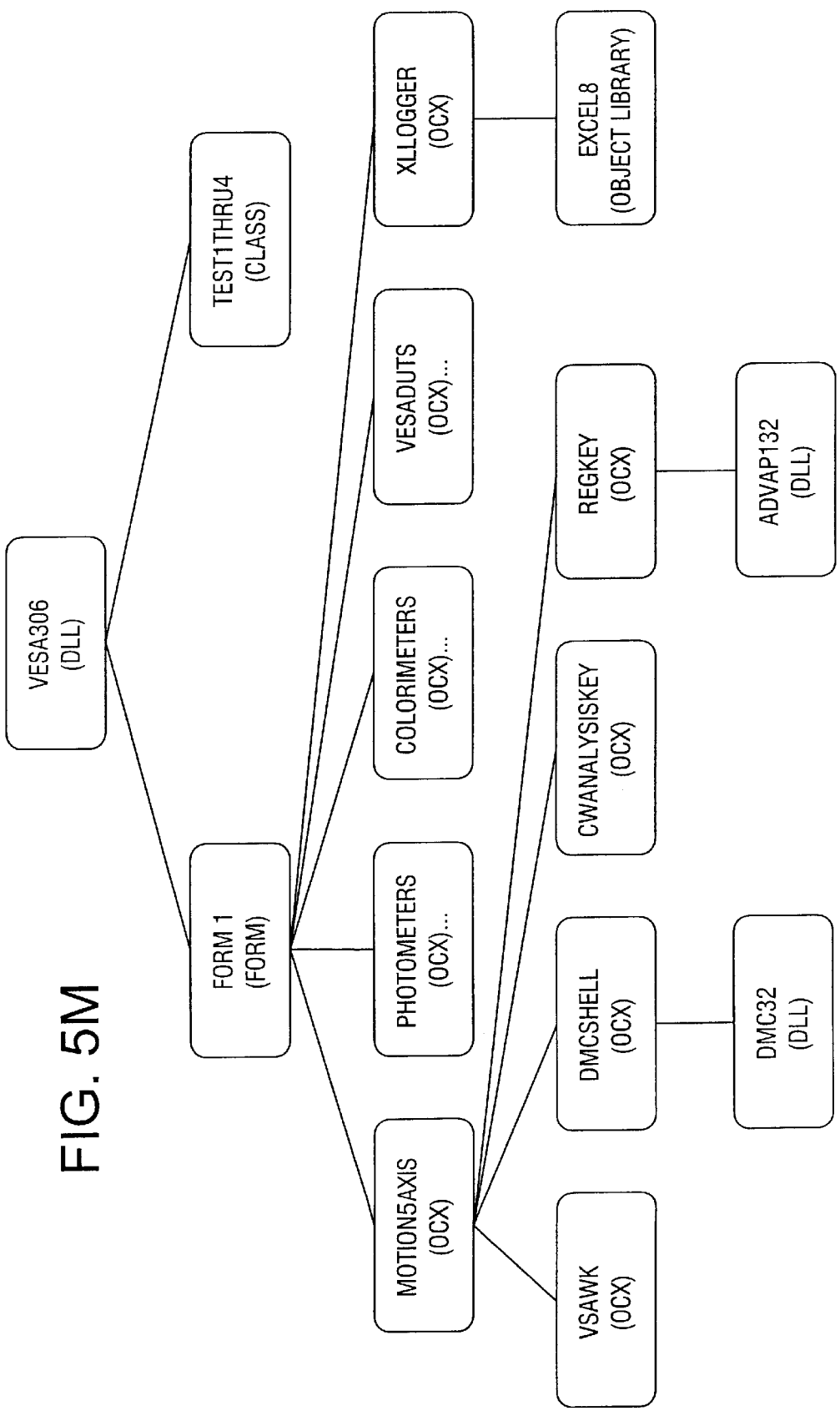
Figure 5N:
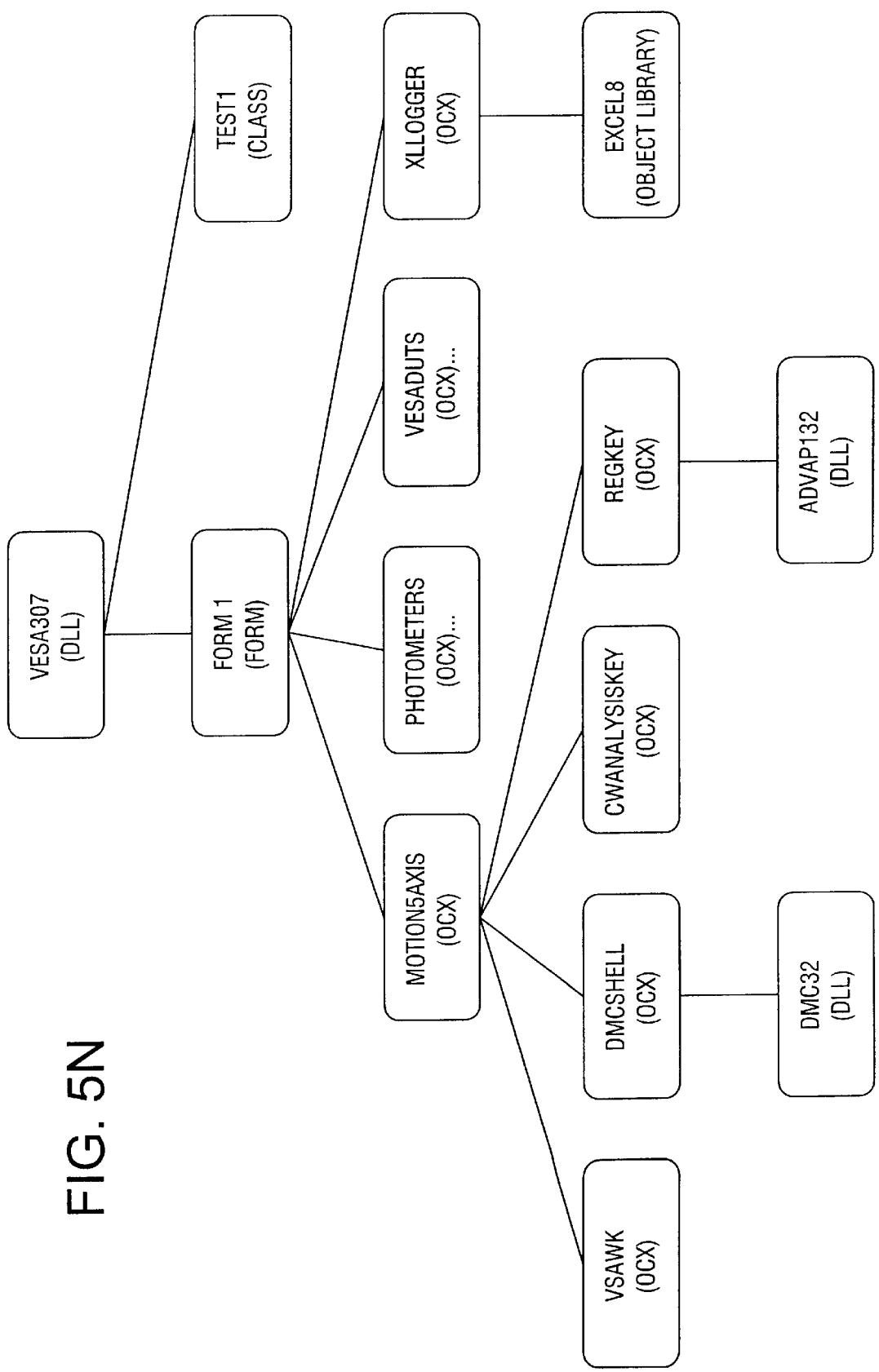
Figure 50:
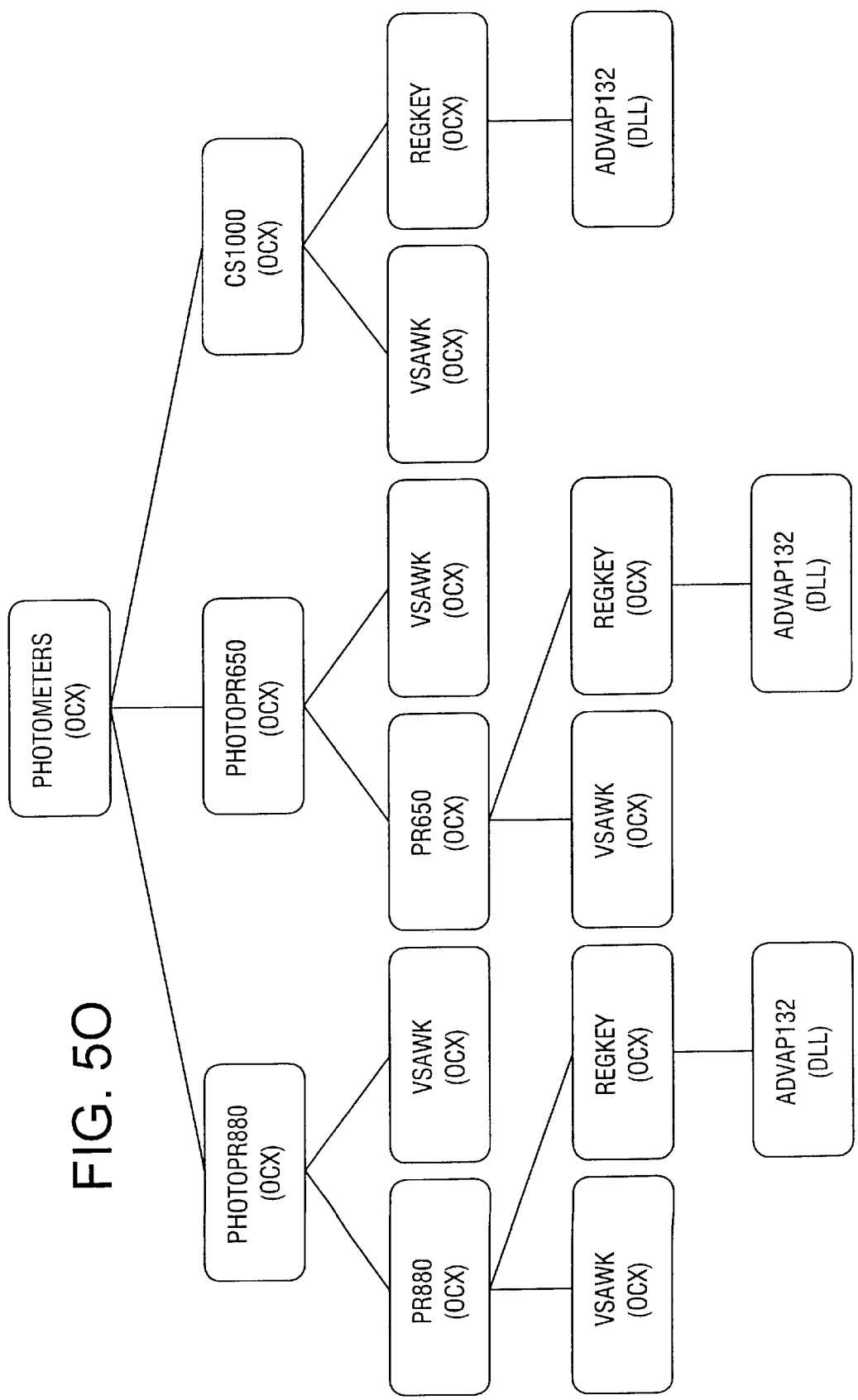
Figure 5P:
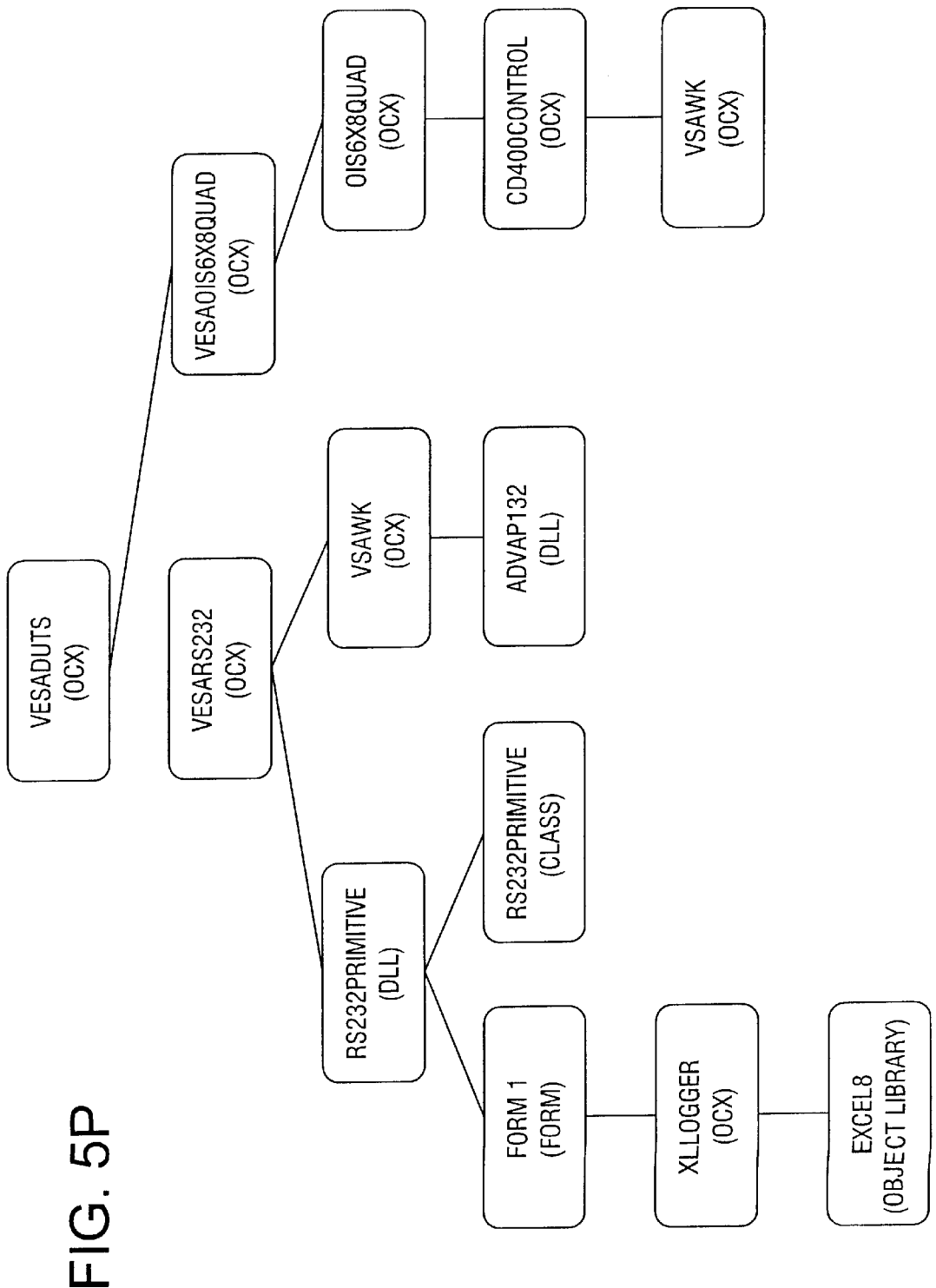
Figure 5Q:
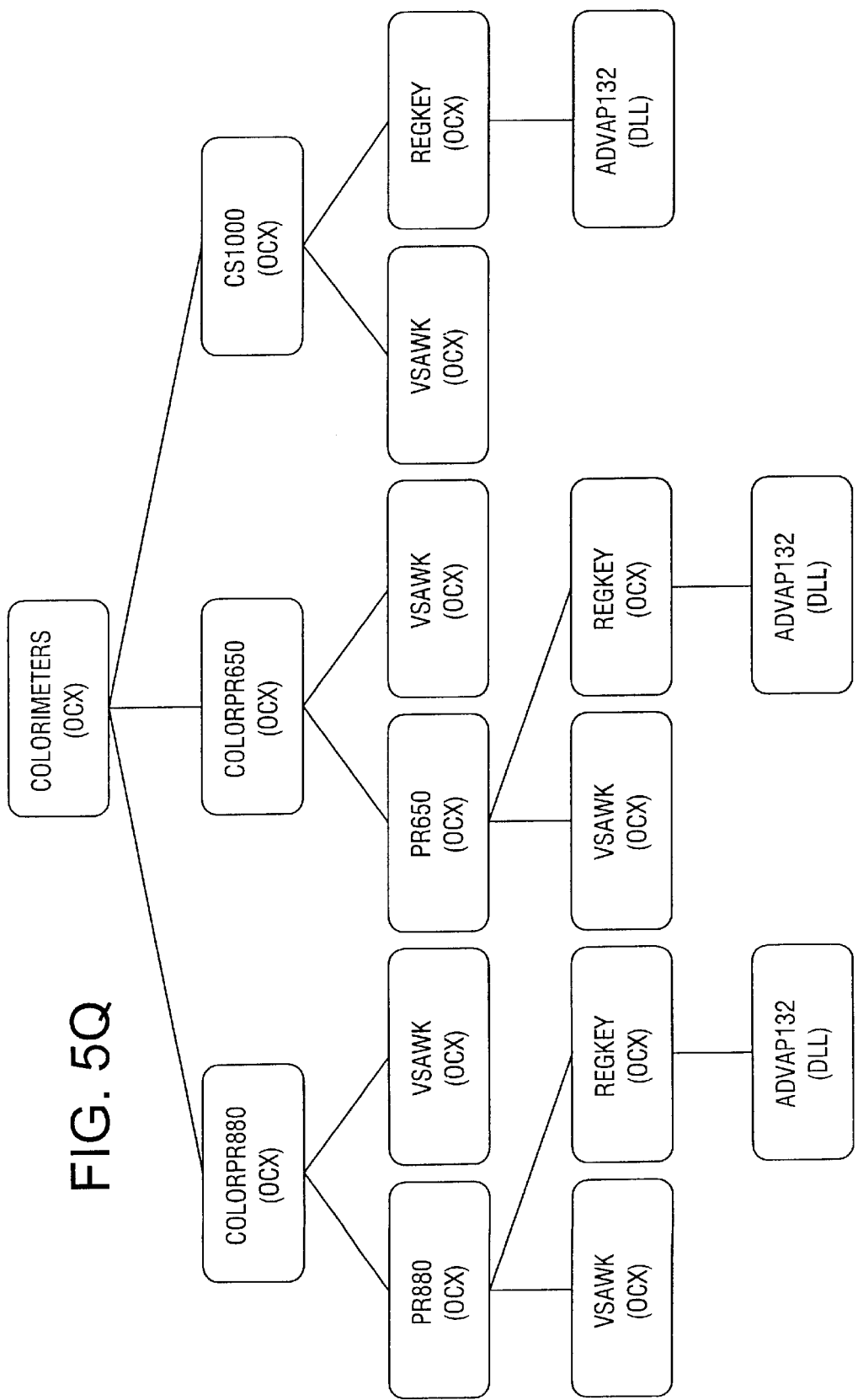
Figure 6A:
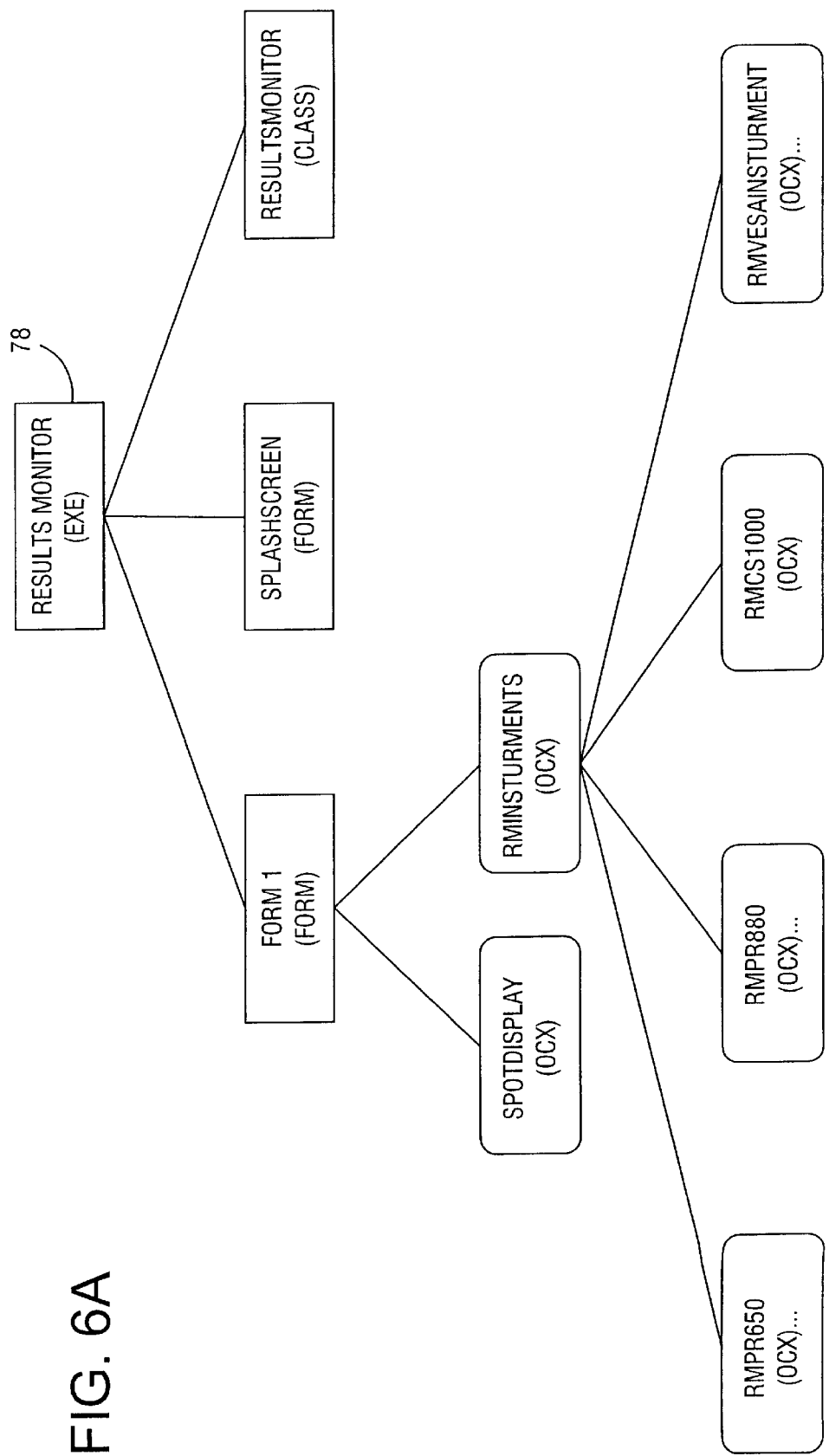
Figure 6B:
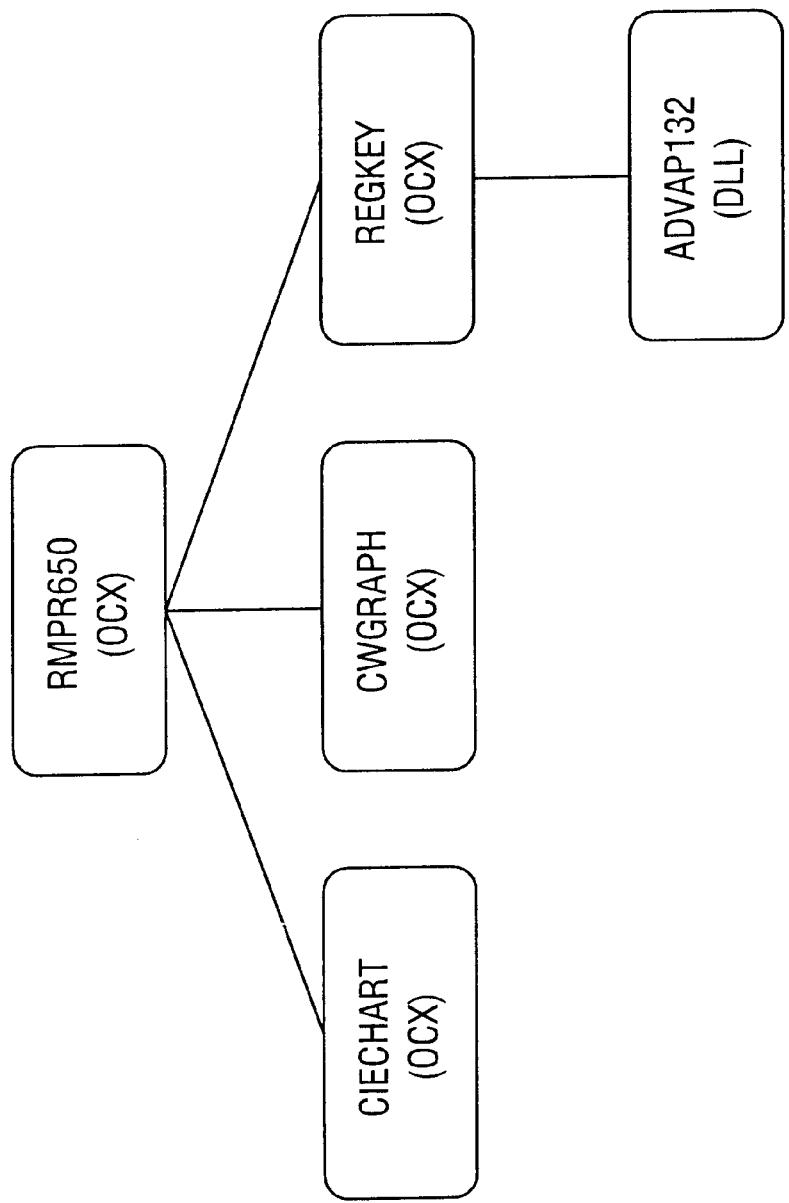
Figure 6C:
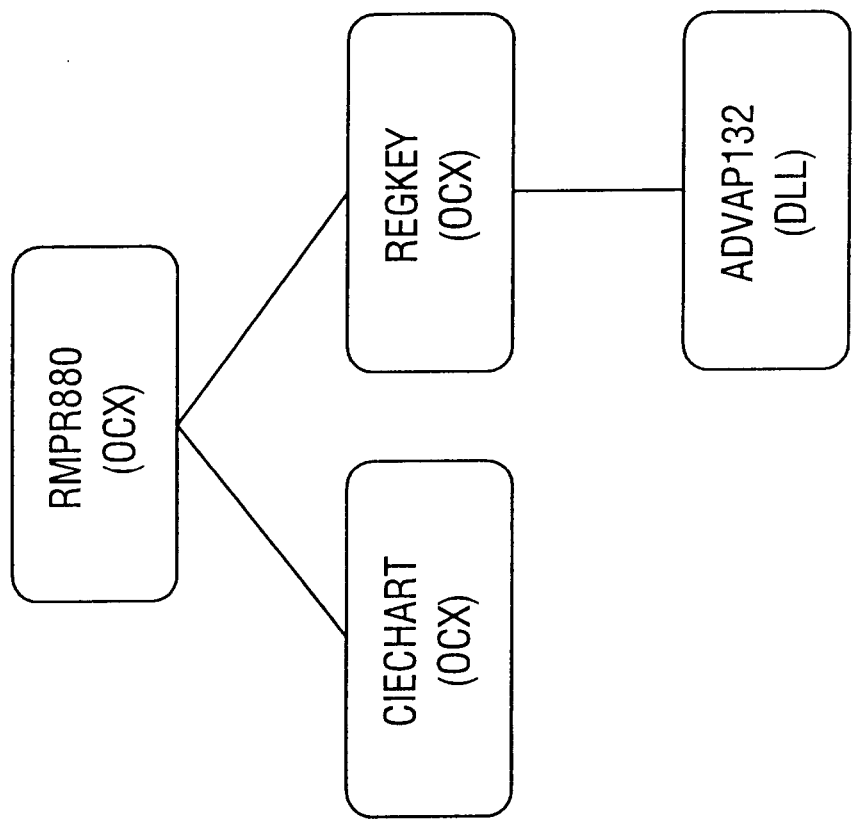
Figure 6D:
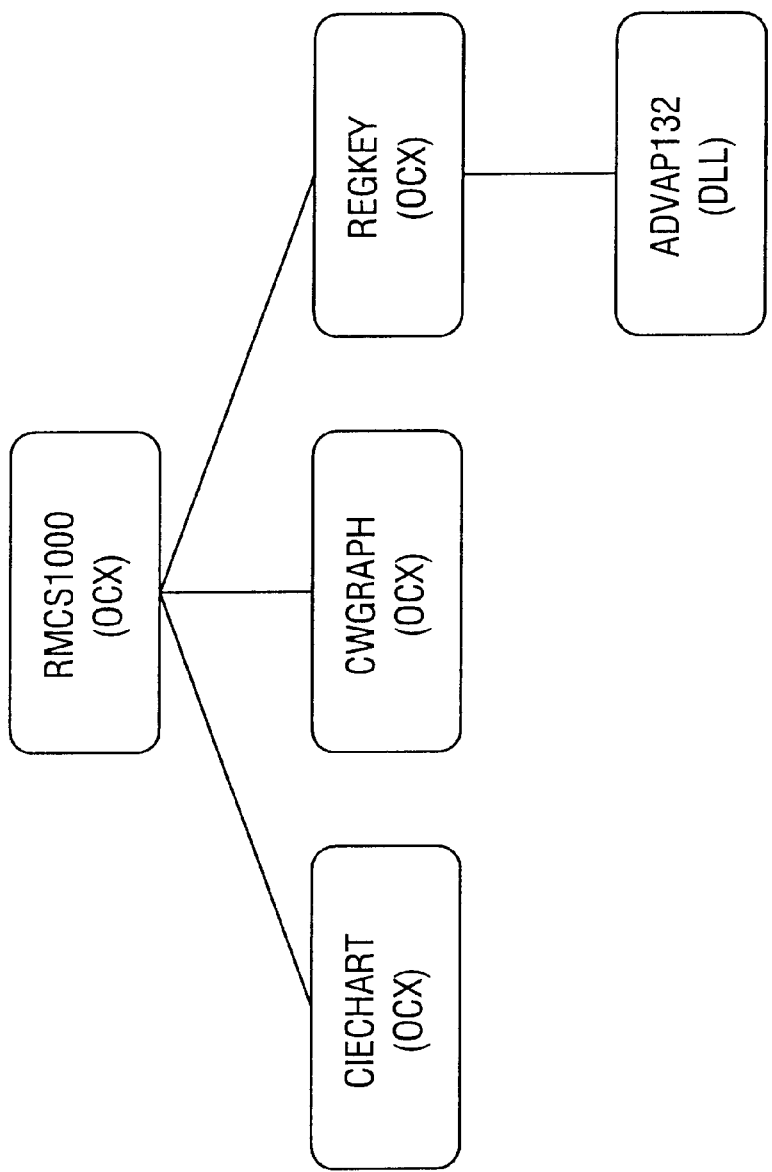
Figure 6E:
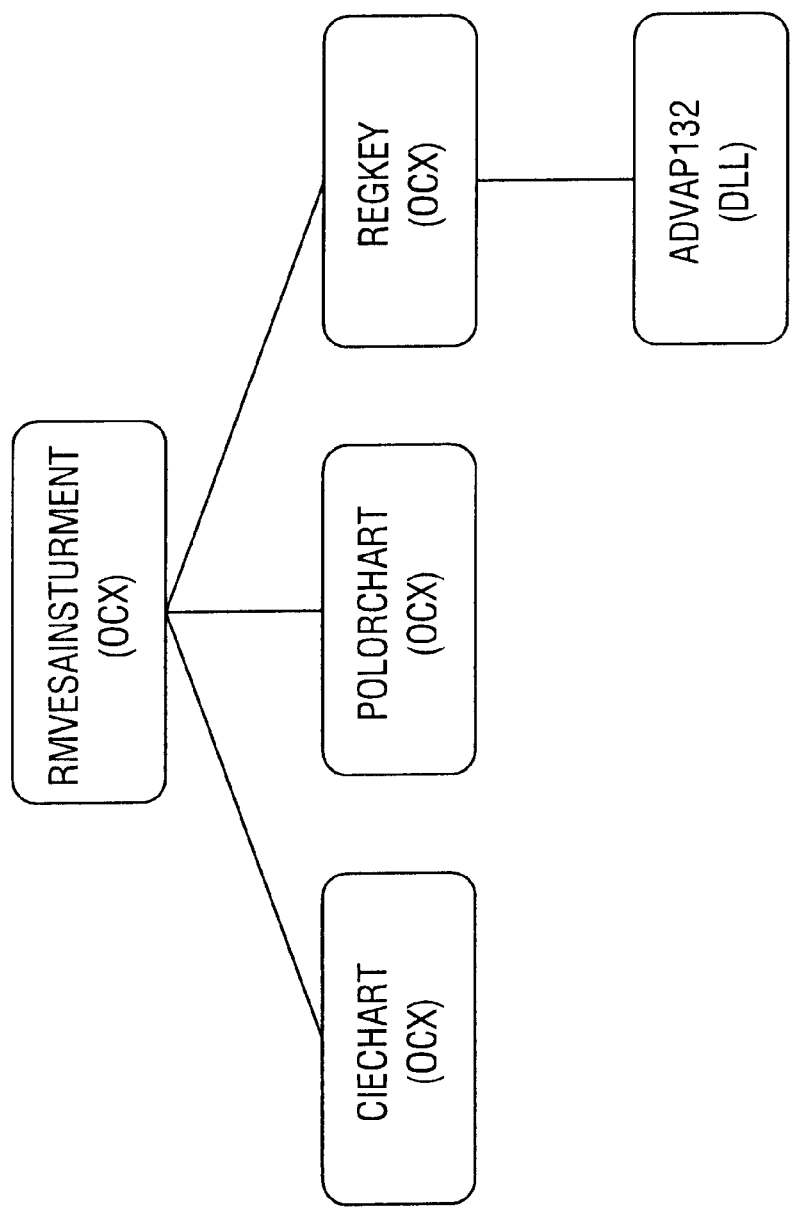

The system controller 52 executes operating software having two main applications: a Manual Control Interface (MCI) 74 (shown in FIGS. 4A–4G) and an Automated Test Sequencer (ATS) 76 (shown in FIGS. 5A–5Q). The MCI 74 provides direct control over motion stage 14, LMD 18 and DUT 12 (via system 58). The ATS 76 runs automated test sequences. In a preferred embodiment, both applications run under the Windows NT operating system on a Pentium-300 class desktop personal computer which embodies system controller 52. In addition, system controller 52 also executes software implementing a results monitor 78 (shown in FIGS. 6A–6E) for displaying the results of the various display performance tests and an emergency stop 80 (shown in FIG. 7) for stopping system 10 in response to the user depressing a stop button.

As described above, system controller 52 operates to maintain an approximately constant distance between LMD 18 and the surface of DUT 12 and to maintain accurate XY tracking of a given region of interest on the display. As a result, system 10 maintains the focal distance of LMD 18 approximately constant for proper optical instrument operation. Further, this ensures accurate and repeatable luminance and chrominance measurements. In both MCI 74 and ATS 76, system controller 52 employs a set of geometric equations and commands which cause LMD 18 to move in concert with DUT 12 for maintaining a uniform distance between the two. In other words, system controller 52 translates the spot of interest as rotational stage 22 tips and turns DUT 12. As described above, system controller 52 applies a series of rotation matrices to the initial spot location vector and translates the resulting vector location into position coordinates for LMD 18. In this manner, the instrument line of sight tracks the spot on the display surface while maintaining constant focal distance.

In a preferred embodiment of the invention, the system software executed by system controller 52 provides modularity of DUT stimulus and LMD interfaces. In other words, the software supports multiple optical instruments by coding the interface requirements unique to each instrument and making them generic to system 10. As such, the user may make luminance and chrominance measurements without regard to the particular type of instrument installed on translational motion stage 20. Similarly, the DUT stimulus mechanism of system 58 is generic in that full screen color and gray-level test patterns may be commanded without regard to the particular type of test pattern generator actually connected to DUT 12.

According to the invention, MCI 74 permits the user to directly control the test pattern appearing on DUT 12 and command LMD 18 to make photometric or colorimetric measurements at specific locations on the display surface. Major components of MCI 74 include a DUT control interface 84, a five-axis control interface 86 and an optical instrument control interface 88. Depending on the type of optical instrument being used, measurement results appear on, for example, CIE chromaticity charts, spectral distribution graphs and luminance level displays of a user interface screen implemented by MCI 74. Preferably, MCI 74 is also used during set-up and alignment of system 10.

Referring now to FIGS. 5A–5Q, the user preferably creates a test sequence with ATS 76 which includes a number of test functions (e.g., primitive commands or standard VESA tests) for moving motion stage 14, generating a specific test pattern on DUT 12 and measuring the light emissions from DUT 12 with LMD 18. In one embodiment, system controller 52 logs photometric and colorimetric measurement results directly to a spreadsheet (e.g., a Microsoft Excel spreadsheet) and/or an ASCII test report file. As an example, system controller 52 implements the test sequencing portion of ATS 76 with a modified version of National Instrument's Labwindows/CVI Test Executive. The test sequencer preferably supports test sequencing based on pass/fail status, logging of test results, generating ASCII test reports to file, run-time interfacing including prompts for operator, pass and fail banners and run-time error notification, forcing individual tests to pass, fail, or skip for test sequence debugging, halting and looping on individual test failure, testing continuously and using different operating levels. Individual test functions invoked by ATS 76 are written in, for example, Visual Basic.

The ATS 76 interfaces with test functions using ANSI C parameter passing mechanisms which requires that test functions adhere to a standard C prototype defined by ATS 76. Since the Test Executive is not capable of using ActiveX interfaces, system controller 52 advantageously implements an ActiveX Wrapper developed to appear as a test function to ATS 76 and as an automation client to the automation server. In a preferred embodiment of the invention, ATS 76 uses ActiveX technology in this manner to exploit the capabilities of ActiveX development environments such as Visual C++, Visual Basic and Delphi or other ActiveX or OLE compliant development tools.

As described above, the software implementing MCI 74 provides a graphical user interface for controlling the movements of five-axis motion base 14, DUT 12 and LMD 18. The listing below provides an object dictionary describing the programming objects of MCI 74 as they appear in FIGS. 4A–4G:

Splash Screen (FORM): Form appears at program start-up, contains Westar© copyright information.

Manual Motion Control (OCX): Provides a graphical user interface for controlling the motion base via Axis, Polar Display Space and Orthogonal Display space.

Manual DUTs (OCX): The collection of all manual DUT graphical user interfaces available in a given configuration of the Manual Control Interface.

Manual RS232 (OCX): Provides a graphical user interface for sending and receiving text over an RS232 serial interface.

Manual OIS6x8 Quad (OCX): Provides a graphical user interface for controlling an OIS 6x8 Quad pixel LCD with a CD-400.

Manual Instruments (OCX): The collection of all LMD graphical user interfaces available in a given configuration of the Manual Control Interface.

Manual PR880 (OCX): Provides a graphical user interface for controlling a PR880.

Manual PR650 (OCX): Provides a graphical user interface for controlling a PR650.

Manual CS1000 (OCX): Provides a graphical user interface for controlling the CS1000 LMD.

Motion 5 Axis (OCX): Provides a programmatic means for executing Axis, Polar Space and Display Space coordinated movements.

VS Awk (OCX): Used to parse strings.

DMC Shell (OCX): ActiveX Control wrapper around the DMC32 DLL (dynamic linked library).

DMC32 (DLL): Provides an API for sending commands to and receiving responses from a Galil controller card.

CW Analysis Key (OCX): National Instruments ComponentWorks analysis library used to perform matrix multiplication and manipulation.

Reg Key (OCX): Object which allows clients to save and retrieve values from the registration database.

ADV API (DLL): DLL which exposes interfaces to the registration database.

CW Button (OCX): National Instruments ComponentWorks Button used as a push-on/push-off button.

COMM Port List (OCX): Provides a graphical user interface allowing selection of a comm port from the available comm ports present on a given machine.

Panel (OCX): Graphical User Interface "3D look" panel widget.

OIS 6x8 Quad (OCX): Provides a programmatic means for controlling an OIS 6x8 quad LCD (driven by a CD-400).

CD-400 Control (OCX): Provides a programmatic interface to the CD-400 which hides the details of RS232 communications.

CIE Chart (OCX): Provides a graphical user interface for display of CIE 1976 and CIE 1931 chromaticity charts.

PR880 (OCX): Provides a programmatic interface to the PR880 which hides the details of RS232 communications.

Error Handler (OCX): Returns errors from low level objects to using objects.

PR650 (OCX): Provides a programmatic interface to the PR650 which hides the details of RS232 communications.

CS1000 (OCX): Provides a programmatic interface to the CS1000 which hides the details of RS232 communications.

Referring again to FIGS. 5A–5Q, system controller 52 uses ATS 76 to sequence ActiveX Test objects. The listing below provides an object dictionary describing the objects of ATS 76, as they appear in FIGS. 5A–5Q, which were not described above:

ActiveX Wrapper (LIB): Export Library which makes the ActiveXTestwrapper.dll (dynamic linked library) appear as a standard (statically linked library). The Test Executive cannot directly use dynamic linked libraries.

ActiveX Wrapper (DLL): Interface function between the ANSI C interfaces of the Automated Test Sequencer and the ActiveX interfaces of the ActiveX test objects.

CVITXUIR (UIR): LabWindows/CVI user interface resource file.

CVIRT4 (RSC): Labwindows/CVI resource file.

CVIRTE (DLL): Run time library for the LabWindows/CVI Test Executive.

CVIRT (DLL): LabWindows/CVI run time library.

Motion Primitives (DLL): Contains the available motion base primitives (AxisMove, PolarDispMove, and OrthoDispMove).

OIS 6x8 Primitive (DLL): Primitive used for control of an OIS 6x8 Quad LCD (driven by a CD-400) via the Automated Test Sequencer.

PR650 Primitive (DLL): DLL containing the PR650 Primitive ActiveX test object.

PR880 Primitive (DLL): DLL containing the PR880 Primitive ActiveX test object.

CS1000 Primitive (DLL): DLL containing the CS1000 Primitive ActiveX test object.

RS232 Primitive (DLL): DLL containing the RS232Primitive test object.

Sequence Utilities (DLL): DLL containing the Log, ParkMotionBase, PrintReport, and SaveReport test objects.

VESA Utilities (DLL): DLL containing the ReportHeader and ClearReport ActiveX test objects.

N Point Viewing Angle (DLL): Implements the N Point Viewing Angle ActiveX test object.

Form 1 (FORM): General container form for underlying objects.

Excel 8 (OBJECT LIBRARY): Type library for the Excel 8 (Excel 97) object hierarchy.

XL Logger (OCX): Provides a programmatic means for client objects to write data into Excel spreadsheets.

Ortho Disp Move (CLASS): Primitive for executing Orthogonal Display Space coordinated moves via the Automated Test Sequencer.

Polar Disp Move (CLASS): Primitive for executing Polar Display Space coordinated moves via the Automated Test Sequencer.

Axis Move (CLASS): Motion primitive used to perform coordinated moves in Axis (non-display) space.

PR650 Primitive (CLASS): Abstraction layer on top of the PR650 object, which adheres to the interfaces required of an ActiveX test object.

PR880 Primitive (CLASS): Abstraction layer on top of the PR880 object, which adheres to the interfaces required of an ActiveX test object.

CS1000 Primitive (CLASS): Abstraction layer on top of the CS1000 object, which adheres to the interfaces required of an ActiveX test object.

RS232 Primitive (CLASS): Test object allowing RS232 commands and responses to be sent and received via ATS sequences.

Log (CLASS): Provides a means by which arbitrary strings may be placed into cells of a specified Excel report.

Park Motion Base (CLASS): Primitive used for "parking" the motion base via the Automated Test Sequencer.

Print Report (CLASS): ActiveX test object used to print an Excel spreadsheet via the Automated Test Sequencer.

Save Report (CLASS): Test object allowing Excel spreadsheets to be saved using the Windows Common Dialog box.

Header Info (FORM): Provides a graphical user interface for entering data to be placed into the header of a VESA report.

Clear Report (CLASS): ActiveX Test object used to clear the VESA report.

Report Header (CLASS): ActiveX test object used to fill in the header information of a VESA report via the Automated Test Sequencer.

Photometers (OCX): Abstraction layer providing "standardized" photometer interfaces for use by the VESA and nPointViewingAngle tests.

VESA DUTs (OCX): Abstraction layer providing "standardized" DUT interfaces for use by the VESA and nPointViewingAngle tests.

Colorimeters (OCX): Abstraction layer providing "standardized" colorimeter interfaces for use by the VESA and nPointViewingAngle tests.

VESA 302 Test1 Thru 4 (CLASS): ActiveX test object which implements the Full-Screen Center section of the VESA Suite of Basic Measurements.

VESA 302 Test5 (CLASS): ActiveX test object which implements the Full-Screen Gray Scale section of the VESA Suite of Basic Measurements.

VESA 306 Test1 Thru 4 (CLASS): ActiveX test object which implements the Uniformity section of the VESA Suite of Basic Measurements.

VESA 307 Test1 (CLASS): ActiveX test object which implements the Viewing Angle section of the VESA Suite of Basic Measurements.

Photo PR880 (OCX): Abstraction layer which translates the PR880 object's interfaces into those required by the Photometers object.

Photo PR650 (OCX): Abstraction layer which translates the PR650 object's interfaces into those required by the Photometers object.

VESA RS232 (OCX): Object allowing communication over an RS232 serial port and adhereing to the interfaces required by the VESA DUTs object.

VESA OIS 6x8 Quad (OCX): Abstraction layer which translates the OIS 6x8 Quad object's interfaces into those required by the VESA DUTs object.

Color PR880 (OCX): Abstraction layer which translates the PR880 object's interfaces into those required by the Colorimeters object.

Color PR650 (OCX): Abstraction layer which translates the PR650 object's interfaces into those required by the Colorimeters object.

As described above, the software implementing the results monitor 78 MCI 74 provides a graphical user interface for showing the user the results of test sequences as they occur. In a preferred embodiment, this application contains the Result Monitor class and the Results Monitor Graphical User Interface. The listing below provides an object dictionary describing the programming objects of results monitor 78, as they appear in FIGS. 6A–6E, which were not described above:

Results Monitor (EXE): Application containing the This application is used to show the results of test sequences as they occur.

Spot Display (OCX): Provides a graphical user interface for displaying the location of the LOS of the LMD on the face of an arbitrary display.

RM Instruments (OCX): The collection of all instrument graphical user interfaces available in a given configuration of the Results Monitor.

RM PR650 (OCX): Graphical user interface for displaying PR-650 measurement results within the Results Monitor.

RM PR880 (OCX): Graphical user interface for displaying PR-880 measurement results within the Results Monitor.

RM CS1000 (OCX): Graphical user interface for displaying CS-1000 measurement results within the Results Monitor.

RM VESA Instrument (OCX): Graphical user interface for displaying VESA and nPointViewingAngle test results within the Results Monitor.

Results Monitor (CLASS): This class exposes an automation server interface so that the ATS may display the results of testing on the Results Monitor.

CW Graph (OCX): National Instruments ComponentWorks graph. Used to display the spectral graphs of spectroradiometers.

Polar Chart (OCX): Provides the chart used to graphically depict the results of the nPointViewingAngle test.

Figure 7:
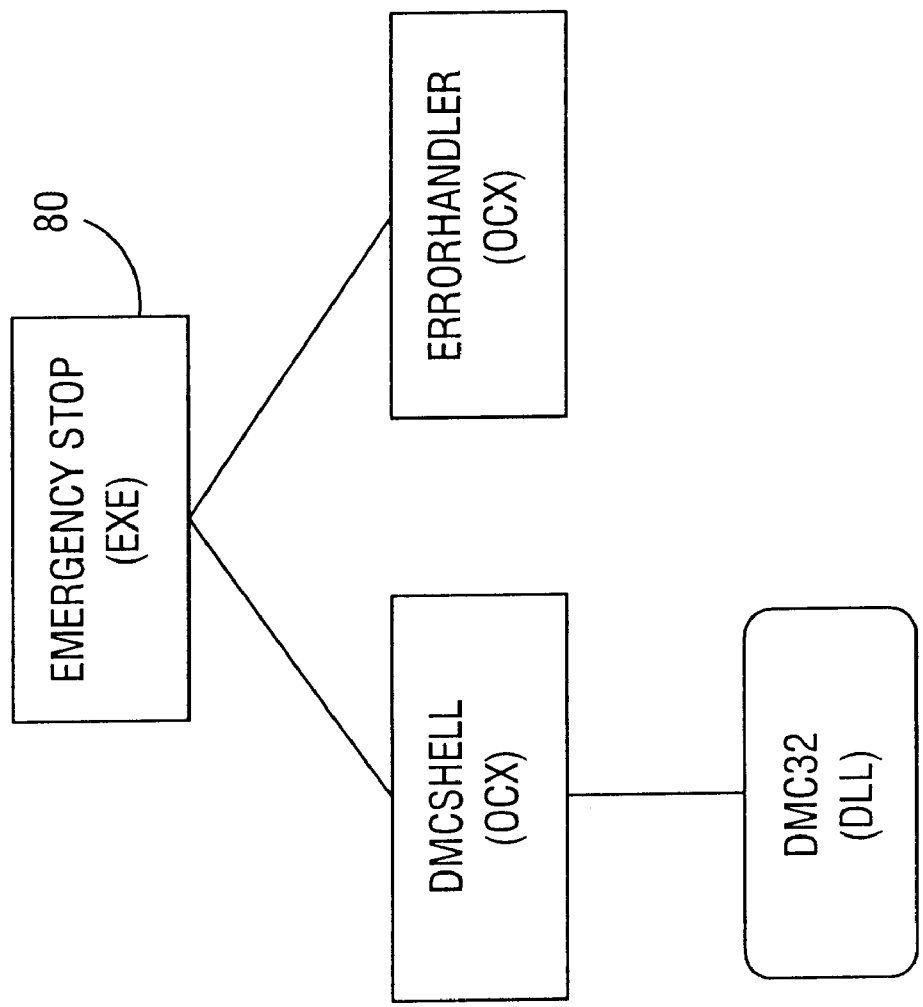

With respect to FIG. 7, the emergency stop application executed by system controller 52 implements a "Tray Icon" application which issues a series of consecutive stop commands to the Galil controller card when double clicked.

As described herein, system 10 provides three-axis and two-axis motion with translational and rotational stages 20, 22, respectively, and coordinate transformation between the two for automatically tracking the region of interest on DUT 12 and maintaining a substantially uniform distance between LMD 18 and the spot which results in maintaining focus and approximate spot size.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A system for inspecting a visual display under test, said system comprising:
    an optical instrument for measuring an electro-optical characteristic within a defined region of interest on the display;
    a translational stage for moving the optical instrument relative to the display in at least one of three generally orthogonal directions, said optical instrument being mounted on the translational stage;
    a rotational stage for rotating the display about at least one of two generally orthogonal axes, said display being mounted on the rotational stage;
    a controller for controlling the translational and rotational stages to position the optical instrument at a desired position relative to the display and to position the display at a desired viewing angle relative to the optical instrument.

2. The system of claim 1 wherein the translational stage comprises a vertical member and a transverse member mounted on an elongate base, said vertical and transverse members and said elongate base being positioned generally orthogonal to each other.

3. The system of claim 2 wherein the vertical member comprises a generally vertical track and a corresponding carrier for traveling along the track, said carrier of the vertical member including a platform for supporting the optical instrument.

4. The system of claim 2 wherein the elongate base includes a first generally horizontal track and a corresponding carrier for traveling along the first track and wherein the transverse member includes a second generally horizontal track and a corresponding carrier for traveling along the second track, said second track being positioned generally transverse to the first track.

5. The system of claim 4 wherein the transverse member is mounted on the carrier of the elongate base.

6. The system of claim 4 wherein the vertical member is mounted on the carrier of the transverse member.

7. The system of claim 1 wherein the rotational stage comprises a goniometer having a generally horizontal main axis.

8. The system of claim 1 further comprising motors responsive to control signals generated by the controller for driving the translational and rotational stages.

9. The system of claim 1 further comprising an electronic driver instrument for energizing the display for displaying a predetermined image during inspection.

10. The system of claim 1 wherein the region of interest on the display is defined by coordinates in an (x,y,z) coordinate system and wherein the controller defines the position of the optical instrument as a function of the coordinates of the region of interest.

11. The system of claim 10 wherein the optical instrument has a field of view which defines an optical axis and wherein the controller comprises a processor for executing routines to adjust the position of the optical instrument as a function of the viewing angle of the display to maintain the optical axis approximately centered within the defined region of interest on the display when the display is rotated.

12. The system of claim 11 wherein the routines executed by the processor include routines for adjusting the position of the optical instrument as a function of the viewing angle of the display to maintain an approximately uniform distance between the optical instrument and the region of interest on the display.

13. The system of claim 11 wherein the routines executed by the processor include routines for defining a set of transformed (x,y,z) coordinates according to the following:

$$x''=x \cos \beta + (y \sin \alpha + z \cos \alpha)\sin \beta$$

$$y''=y \cos \alpha - z \sin \alpha$$

$$z''=(y \sin \alpha + z \cos \alpha)\cos \beta - x \sin \beta$$

wherein $\alpha$ and $\beta$ are angles representing the elevational tip and azimuthal turn, respectively, of the display and defining the viewing angle of the display and wherein (x'',y'',z'') are the adjusted coordinates of the region of interest on the display.

14. The system of claim 11 wherein the field of view less of the optical instrument is less than or equal to approximately 4°.

15. The system of claim 1 wherein the display comprises a plurality of pixels and the region of interest comprises approximately 500 pixels of the display.

16. The system of claim 1 wherein the controller comprises a processor for generating reports of data related to the inspection of the display.

17. The system of claim 1 further comprising a table on which the translational and rotational stages are mounted, said table including shock absorbing legs.

18. A method of inspecting a visual display under test with an optical instrument positioned apart from the display, said optical instrument having a field of view which defines an optical axis, said method comprising the steps of:

mounting the display on a rotational stage for rotating the display about at least one of two generally orthogonal axes;

defining a region of interest on the display;

rotating the display with the rotational stage to position the display at a desired viewing angle relative to the optical axis;

adjusting the position of the optical instrument relative to the display in at least one of three generally orthogonal directions to maintain the optical axis approximately centered within the defined region of interest on the display when the display is rotated; and measuring an electro-optical characteristic within the defined region of interest on the display with the optical instrument.

* * * * *